US012503322B2

(12) United States Patent
Redman

(10) Patent No.: US 12,503,322 B2
(45) Date of Patent: Dec. 23, 2025

(54) PALLET TOWER FOR HIGH DENSITY PALLET STORAGE AND METHOD

(71) Applicant: QTEK DESIGN LTD., Toronto (CA)

(72) Inventor: Paul Redman, London (CA)

(73) Assignee: QTEK DESIGN LTD., Toronto (CA)

( * ) Notice: Subject to any disclaimer, the term of this patent is extended or adjusted under 35 U.S.C. 154(b) by 0 days.

(21) Appl. No.: 18/717,234

(22) PCT Filed: Dec. 7, 2022

(86) PCT No.: PCT/CA2022/051780
§ 371 (c)(1),
(2) Date: Jun. 6, 2024

(87) PCT Pub. No.: WO2023/102649
PCT Pub. Date: Jun. 15, 2023

(65) Prior Publication Data
US 2025/0042676 A1    Feb. 6, 2025

Related U.S. Application Data

(60) Provisional application No. 63/288,015, filed on Dec. 10, 2021.

(51) Int. Cl.
*B65G 59/06* (2006.01)
*B65G 59/00* (2006.01)

(52) U.S. Cl.
CPC ........... *B65G 59/00* (2013.01); *B65G 59/062* (2013.01); *B65G 2201/0267* (2013.01)

(58) Field of Classification Search
CPC .............. B65G 59/062; B65G 47/8823; B65G 59/101; B65G 59/06; B65G 59/066;
(Continued)

(56) References Cited

U.S. PATENT DOCUMENTS 2,693,898 A * 11/1954 Epperson ............. B65G 59/066
221/76
3,220,570 A * 11/1965 Swanson ................. B65B 11/20
414/789.8
(Continued)

FOREIGN PATENT DOCUMENTS

CN      109051835 A     12/2018
CN      110304430 A     10/2019
(Continued)

OTHER PUBLICATIONS

Written Opinion of the International Searching Authority for International application No. PCT/CA2022/051780 dated Feb. 8, 2023.
(Continued)

*Primary Examiner* — Gregory W Adams
(74) *Attorney, Agent, or Firm* — Carlson, Gaskey & Olds, P.C,

(57) ABSTRACT

A pallet tower for high-density pallet storage which provides for loading and unloading of pallets from a pallet storage area via mechanical operation. The pallet tower has a base frame defining a pallet receiving area, the pallet receiving area for receiving a pallet: a containment frame attached to a support latch frame and/or the base frame, the containment frame defining a pallet storage area for storing the pallet; and a support latch frame attached to the base frame, the support latch frame having a support latch operable between an open configuration and a closed configuration, and the support latch in the closed configuration for supporting the pallet when the pallet is in the pallet storage area.

36 Claims, 47 Drawing Sheets

(58) Field of Classification Search
CPC .... B65G 59/10; B65G 59/102; B65G 59/103; B65G 59/105; B65G 59/106; B65G 59/107; B65G 59/108; B65G 1/14; B65G 2203/043; B65G 57/30; B65G 57/301; B65G 57/302; B65G 59/063; B65G 59/061; B65G 2207/22; Y10S 414/106; Y10S 414/108; Y10S 414/107
USPC ....... 414/797.4, 795.3, 798, 798.1, 927–929; 221/297, 222
See application file for complete search history.

(56) References Cited

U.S. PATENT DOCUMENTS

| | | | | |
|---|---|---|---|---|
| 3,688,920 | A | | 9/1972 | Frish |
| 3,844,423 | A | * | 10/1974 | Loomer ............... B65G 57/302 414/789.9 |
| 6,045,324 | A | * | 4/2000 | Redman ............... B65G 59/063 414/788.9 |
| 8,267,637 | B2 | * | 9/2012 | Ouellette ............... B65G 47/22 414/797.6 |
| 9,181,047 | B2 | | 11/2015 | Redman |
| 10,046,926 | B2 | | 8/2018 | Redman |
| 10,059,521 | B2 | | 8/2018 | Swoboda |
| 10,392,199 | B2 | * | 8/2019 | Karpala ............... B65G 47/086 |
| 11,952,225 | B2 | * | 4/2024 | Harting ................. B65G 1/14 |
| 2017/0267468 | A1 | | 9/2017 | Redman |

FOREIGN PATENT DOCUMENTS

| | | | | |
|---|---|---|---|---|
| EP | 3782930 A1 | * | 2/2021 | ............. B65D 85/62 |
| JP | H05201544 A | | 8/1993 | |
| WO | WO-2016051509 A1 | * | 4/2016 | ............... B08B 3/02 |
| WO | 2020200383 A1 | | 10/2020 | |

OTHER PUBLICATIONS

International Search Report for International application No. PCT/CA2022/051780 dated Feb. 8, 2023.
Supplementary European Search Report for European Application No. 22902556.4 dated Jul. 31, 2025.

* cited by examiner

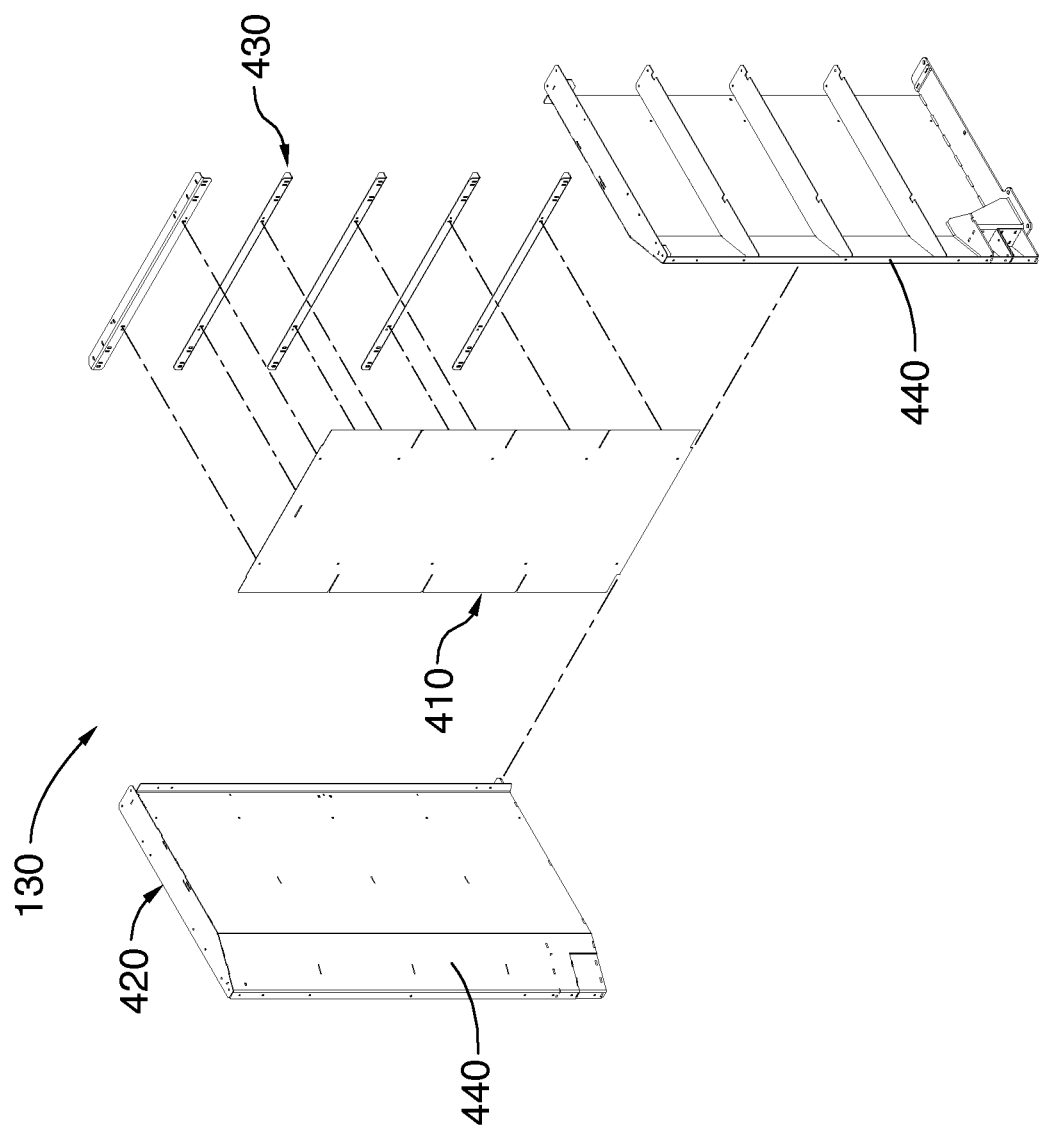

PALLET TOWER FOR HIGH DENSITY PALLET STORAGE AND METHOD

FIELD OF THE INVENTION

The present specification relates generally to a pallet tower, and more particularly to a pallet tower for high-density pallet storage.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

Pallets are ubiquitous in many commercial and industrial operations and have been used for many years. An issue, however, is proper storage of pallets to permit ready access for storing and retrieving pallets.

One proposed solution is a pallet tower, which enables pallets to be stacked to higher levels than if loose, thus reducing the required floor space for pallets. However, there remains the issue of storing and removing pallets from the pallet tower in a safe and effective method.

There are pallet towers which provide electro-mechanical or hydraulic mechanisms to assist in the storage and removal of pallets from the pallet tower. However, not all locations and/or operations are equipped to provide power for these solutions, or deal with the consequent reduction in usability in the event of a power failure or similar situation.

Thus, while there are some pallet towers known in the art, it would be desirable to have a pallet tower which mitigates some of the known disadvantages and limitations.

Accordingly, there remains a need for improvements in the art.

SUMMARY OF THE INVENTION

In accordance with an aspect of the invention, there is provided a pallet tower for high density pallet storage, the pallet tower comprising: a base frame defining a pallet receiving area, the pallet receiving area for receiving a pallet; a containment frame attached to a support latch frame and/or the base frame, the containment frame defining a pallet storage area for storing the pallet, and a support latch frame attached to the base frame, the support latch frame having a support latch operable between an open configuration and a closed configuration, and the support latch in the closed configuration for supporting the pallet when the pallet is in the pallet storage area.

The support latch may further comprise a first and a second pallet support latch pivotally mounted to opposites sides of the support latch frame, the first and second pallet support latches each having a first surface for supporting opposite edges of a bottom surface of the pallet when in the closed configuration and the pallet is in the pallet storage area.

The first and the second pallet support latches may further extend substantially along the side of the support latch frame and substantially support the entire opposite edges of the bottom surface of the pallet.

The first and the second pallet support latches may further be connected by a latch connector bar for pivoting between the open configuration and the closed configuration at the same time. The support latch may stay in the closed configuration by the weight of the pallet, when the pallet is in the pallet storage area.

The support latch may not be operable from the closed configuration to the open configuration when the pallet is in the pallet storage area and supported on the first surface of the first and the second pallet support latches. The support latch may rest in the open configuration due to a biasing spring.

The first and the second pallet support latches may each have a second surface with chamfered edges for acting as a vertical guide for the pallet and for preventing the pallet from catching when travelling between the pallet storage area and the pallet receiving area when in the open configuration.

The pallet tower may further comprise a latch pull chain arm operatively connected to the support latch for urging the support latch from the open configuration to the closed configuration.

The containment frame may have 4 sides for enclosing the pallet when the pallet is in the pallet storage area. The containment frame may have 1 side that allows for visual inspection of the pallet in the storage area.

The containment frame may have 4 solid panel sides and a solid panel top cover for restricting the flow of oxygen and reducing risk of a fire. The top cover may be adapted to cooperate with a sprinkler and/or a fire suppression system.

The support latch frame may have a sloping chamfered surface that is perpendicular to side walls of the base frame for urging the pallet into alignment for the pallet storage area. The base frame may have chamfered side walls for aligning the pallet side to side for the pallet receiving area.

The support latch frame may have a bump stop for providing resistance to a forklift, and a mast and back rest guide sloping chamfered surface for preventing a mast and/or a back rest of the forklift from catching on the pallet tower.

The pallet may not have side openings. The pallet tower may not require electrical, pneumatic, or hydraulic power for operation of the support latch.].

According to an embodiment of the invention, The pallet tower may further comprise a device for detecting when the pallet tower is full. The pallet tower may further comprise a movable door for cooperating with the base frame, the support latch frame, and the containment frame to enclose the pallet receiving area and the pallet storage area for restricting the flow of oxygen and reducing risk of a fire.

According to a further embodiment of the invention, there is provided a method of loading pallets into a pallet tower, comprising: moving a pallet into a pallet receiving area within the pallet tower, the pallet tower comprising a pallet storage area positioned above the pallet receiving area and separated from the pallet receiving area by a support latch frame having a support latch operable between an open configuration and a closed configuration, with the support latch resting in the open configuration; lifting the pallet within the pallet receiving area into the pallet storage area, and lifting the pallet such that a bottom of the pallet is positioned above the support latch; setting the support latch to the closed configuration; lowering the pallet such that the bottom of the pallet is resting upon the support latch, and the pallet is holding the support latch in the closed configuration.

The method may further comprise aligning the pallet to the pallet receiving area prior to lifting the pallet. The aligning may occur when receiving the pallet in the pallet receiving area. Alternatively, the aligning step may occur during the lifting of the pallet from the pallet receiving area to the pallet storage area.

The setting of the support latch to the closed configuration may be performed via operation of a latch pull chain arm. The support latch may be maintained in the closed configuration via the weight of the pallet in the pallet storage area.

The method may further comprise lowering a stored pallet within the pallet storage area onto the pallet in the pallet receiving area prior to the lifting step.

According to a further embodiment of the invention, there is provided a method of unloading pallets from a pallet tower, comprising: engaging a bottom pallet of a stored pallet stack within a pallet storage area in the pallet tower, the pallet tower comprising the pallet storage area positioned above a pallet receiving area and separated from the pallet receiving area by a support latch frame having a support latch operable between an open configuration and a closed configuration; lifting the stored pallet stack by the bottom pallet within the pallet storage area such that the bottom of the bottom pallet is not resting upon the support latch; the support latch automatically returning to the open configuration; and lowering the stored pallet stack into the pallet receiving area.

The method may further comprise: engaging a second pallet in the stored pallet stack, the second pallet in the pallet receiving area, with the pallets of the stored pallet stack below the second pallet remaining in the pallet receiving area, and the pallets above the second pallet including the second pallet forming a second stored pallet stack; lifting the second stored pallet stack by the second pallet within the pallet storage area such that the bottom of the second pallet is positioned above the support latch; setting the support latch to the closed configuration; lowering the second pallet such that the bottom of the second pallet is resting upon the support latch, the second pallet is holding the support latch in the closed configuration, and the second stored pallet stack is in the pallet storage area.

In the method the moving, engaging, lifting, or lowering step may performed via a forklift or a powered lift device.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which:

FIG. 15E is an exploded view of FIG. 15D;

Like reference numerals indicated like or corresponding elements in the drawings.

DETAILED DESCRIPTION OF THE EMBODIMENTS

Figure 1:
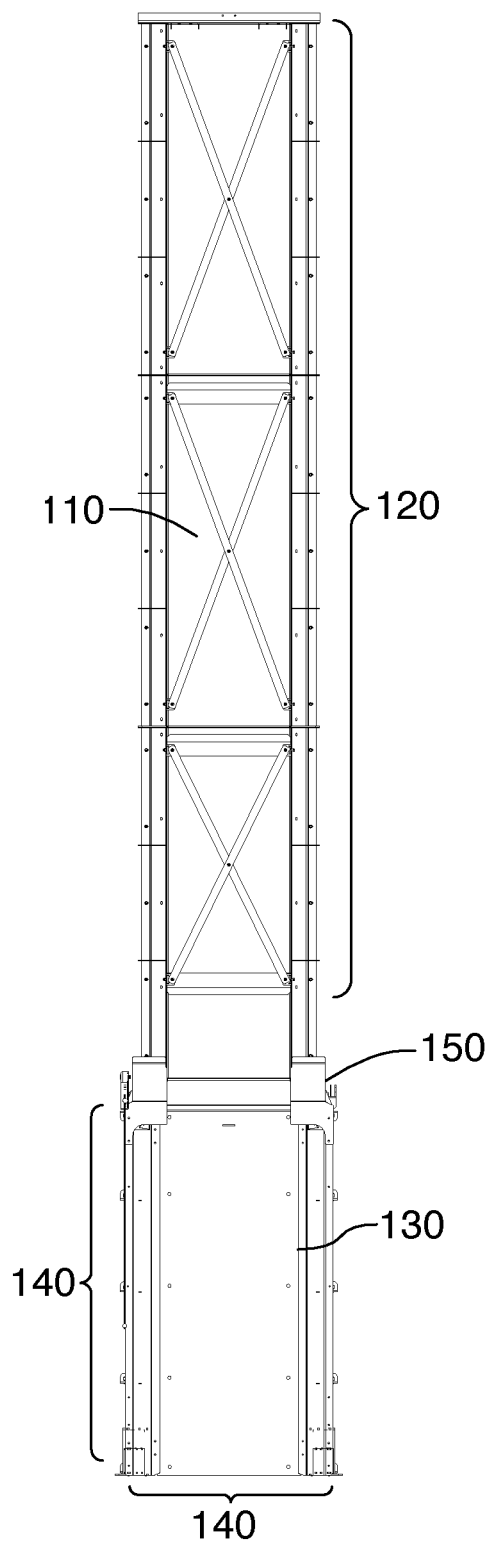
FIG. 1 is a front view of a pallet tower according to an embodiment.
Figure 2:
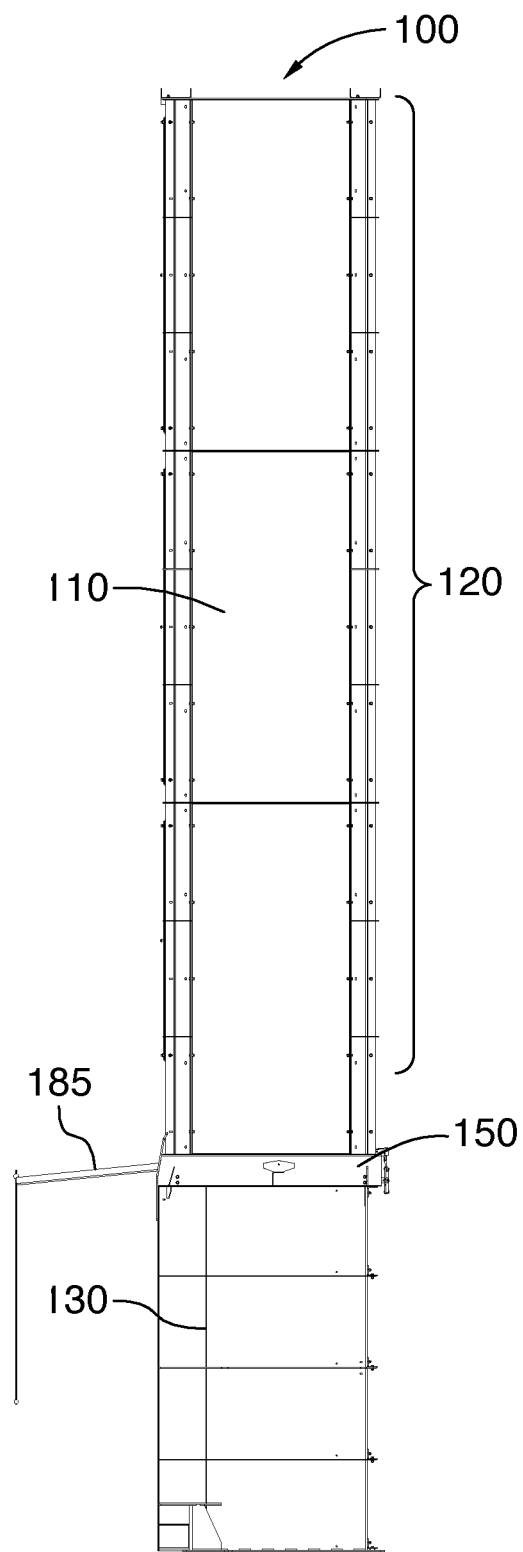
FIG. 2 is a side view of FIG. 1.
Figure 3:
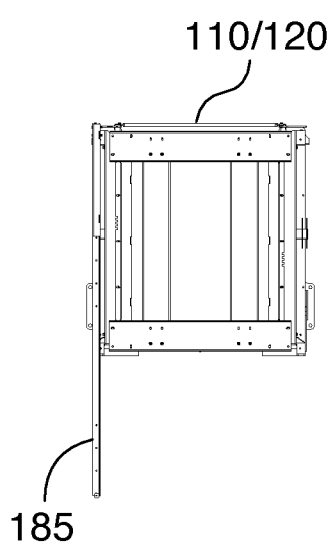
FIG. 3 is a top view of FIG. 1.
Figure 4:
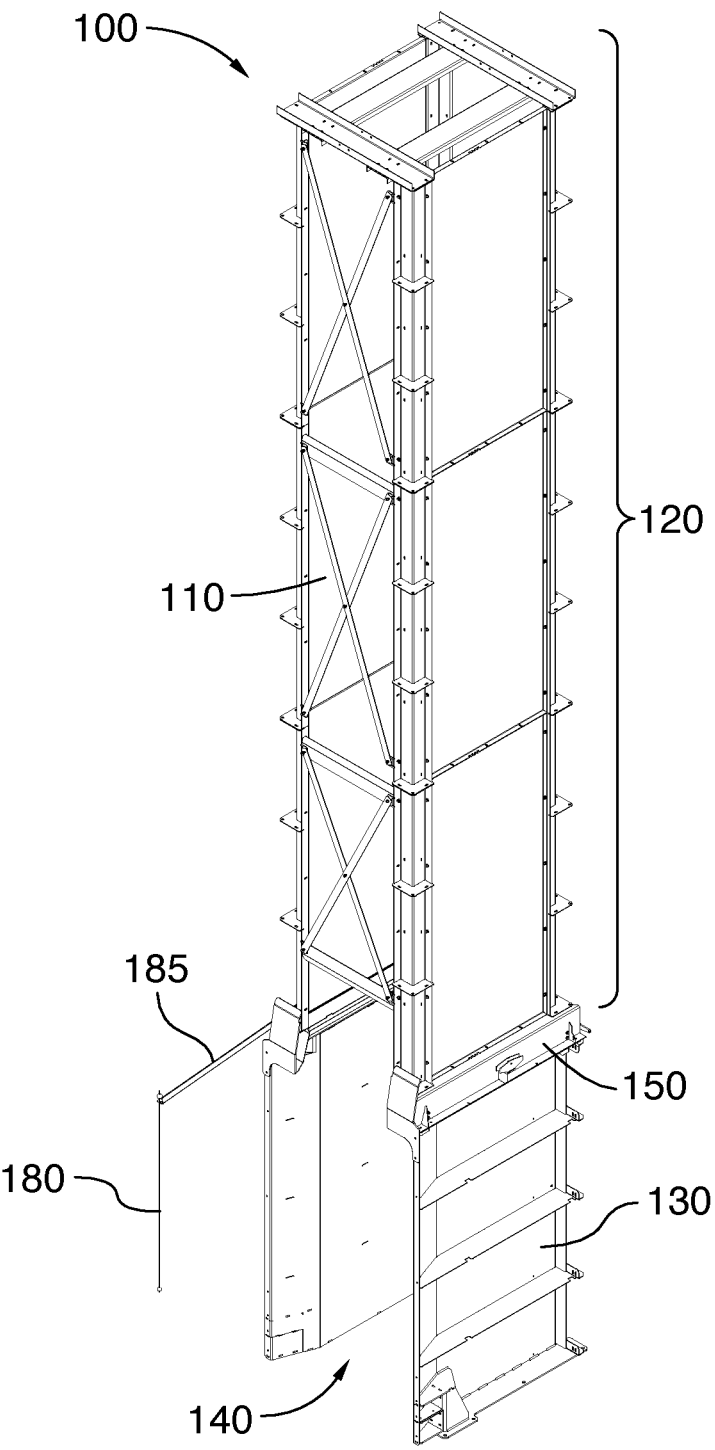
FIG. 4 is a perspective view of FIG. 1.
Figure 5:
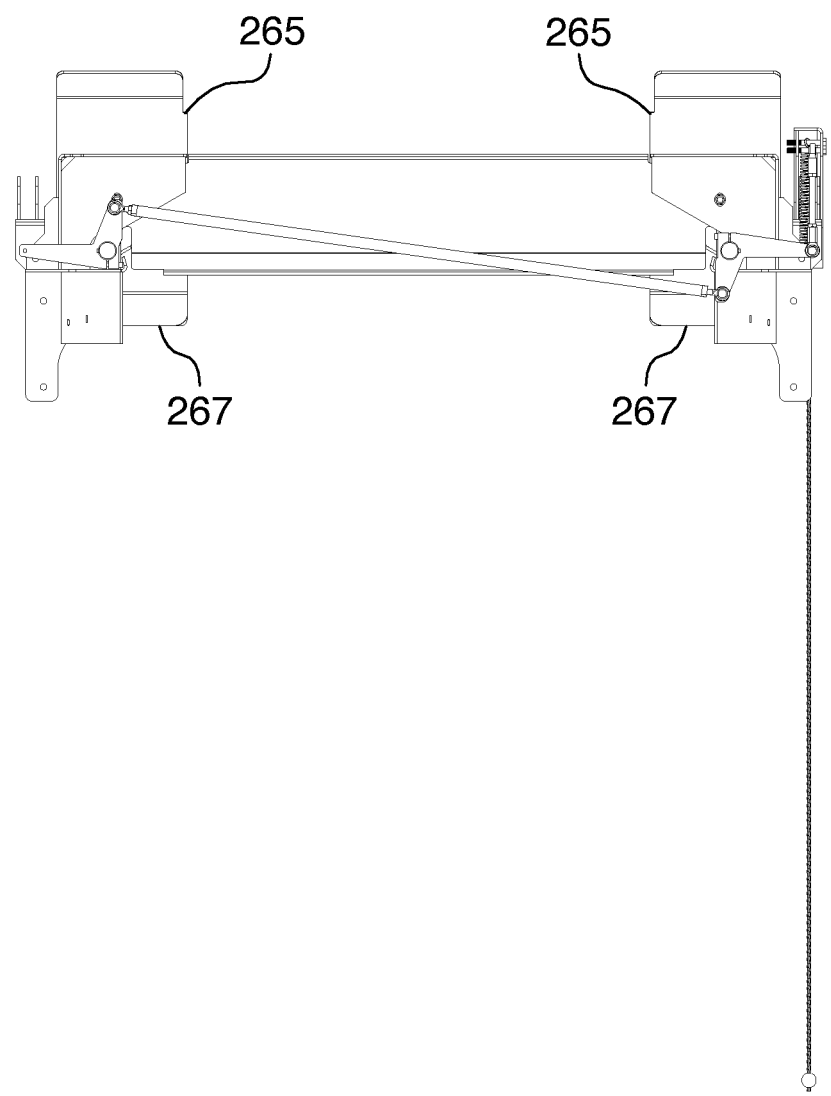
FIG. 5 is a rear view of the support latch frame for the pallet tower.
Figure 6:
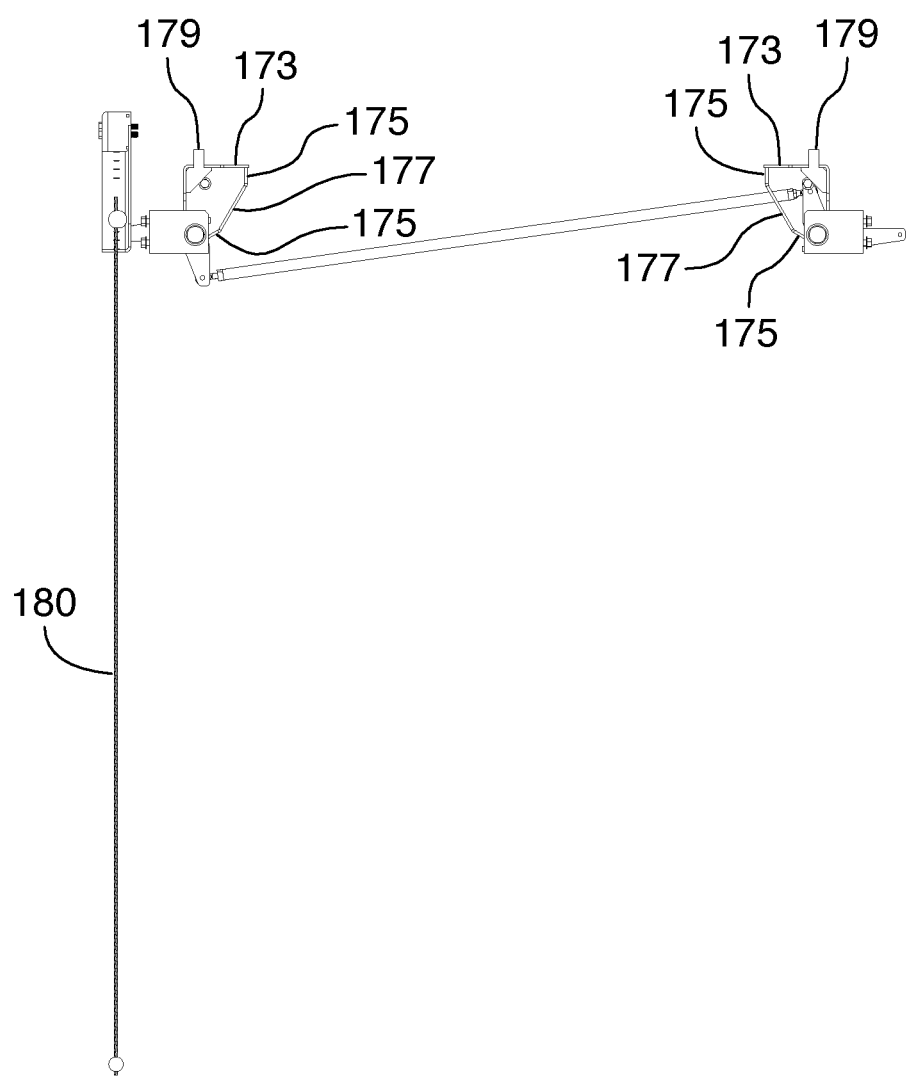
FIG. 6 is a front view of the latch with the support latch frame hidden.
Figure 7:
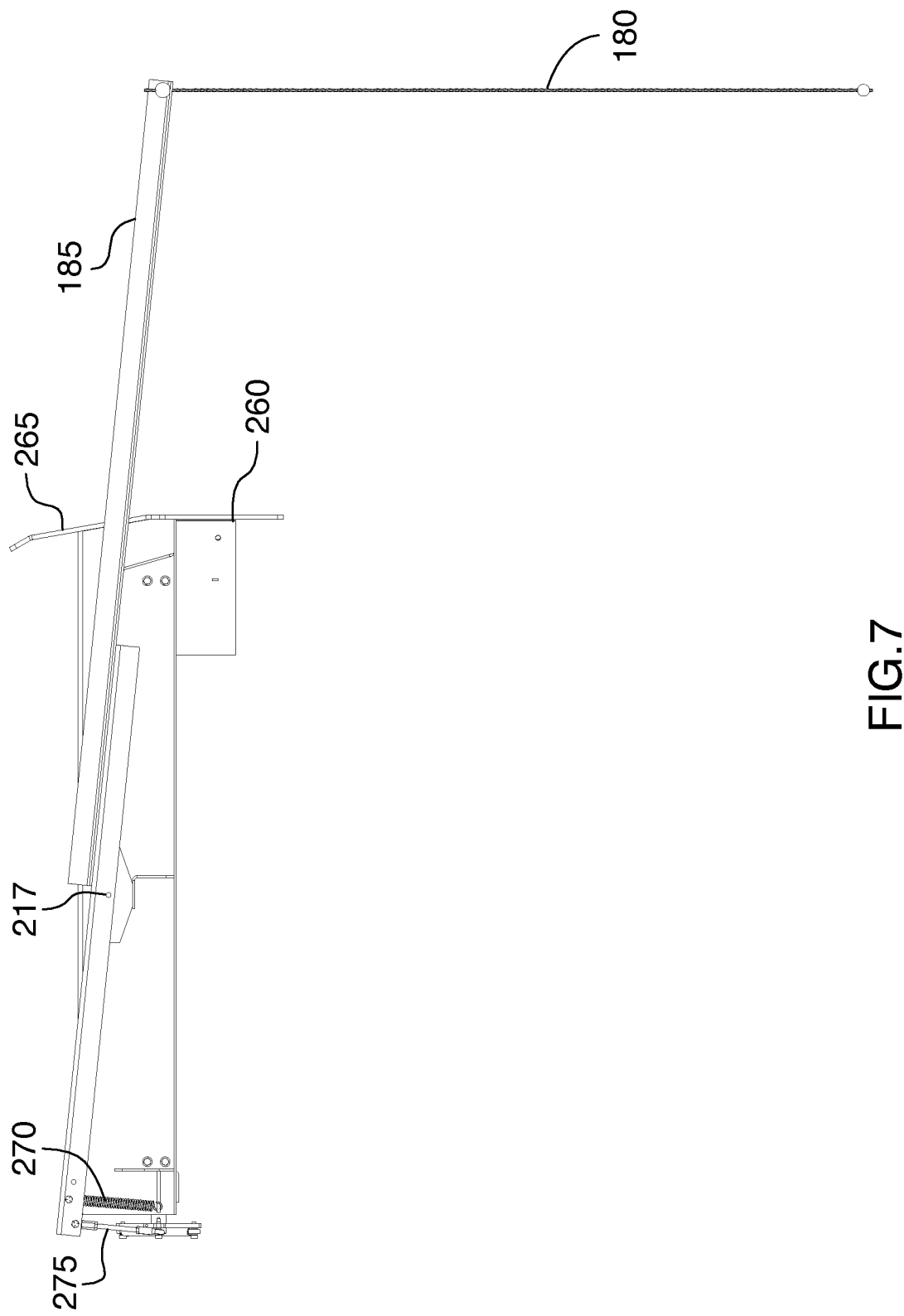
FIG. 7 is a side view of FIG. 5.
Figure 8:
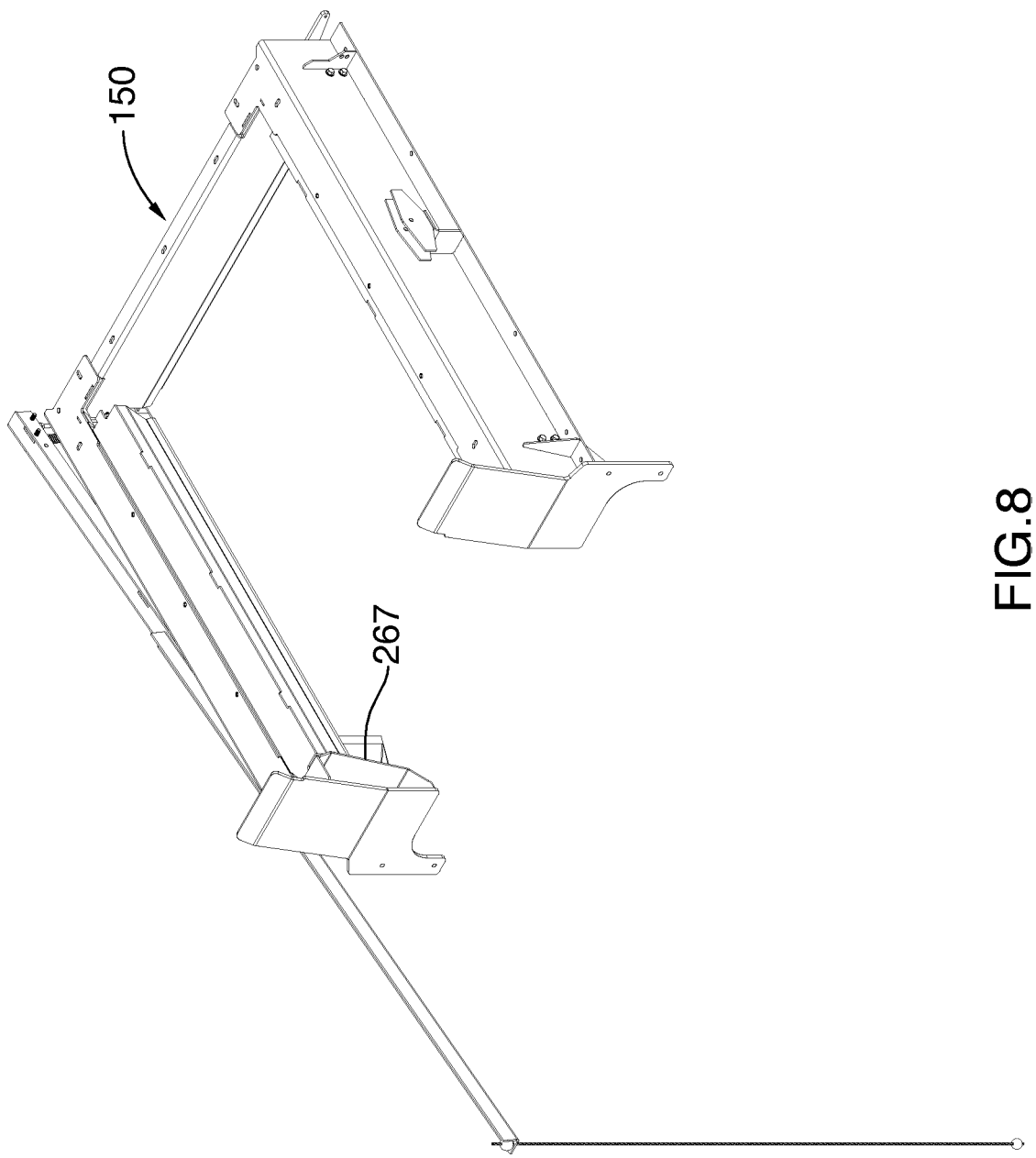
FIG. 8 is a perspective view of FIG. 5.

The present invention relates generally to a pallet tower, and more particularly to a pallet tower for high-density pallet storage.

In the present description, it is to be understood that "pallet" and "pallets" are to be read as both singular and plural, and that a "pallet stack" is comprised of one or more pallets.

LIST OF PARTS

- 100—pallet tower
- 110—containment frame
- 120—pallet storage area
- 130—base frame
- 140—pallet receiving area
- 150—support latch frame
- 160—support latch (left)
- 170—support latch (right)
- 173—flat surface/first surface
- 175—chamfered edge of support latch
- 177—guide surface/second surface
- 179—rotation limiting protrusion
- 180—latch pull chain
- 185—Latch pull chain arm
- 205—rear support frame
- 215—side support frame (left)
- 217—pivot mount for latch pull chain arm
- 225—side support frame (right)
- 230—latch connector arm
- 240—latch connector bar
- 250—latch pivot block
- 260—bump stop
- 265—mast guide
- 267—interior alignment surface
- 270—spring
- 275—rod
- 300—pallet magazine
- 310—rear panel
- 320—side panel
- 330—corner piece
- 340—crossbar
- 350—diagonal crossbeam
- 370—top panel
- 380—openings for fire suppression
- 410—rear wall
- 420—side wall
- 430—rear crossbar
- 440—chamfered edge of base frame
- 500—pallets
- 510—door
- 610—forklift mast According to an embodiment as shown in FIGS. 1-4 a pallet tower 100 is operative to contain and secure pallets (not shown) within a containment frame 110 forming a pallet storage area 120 which is accessed via a base frame 130 forming a pallet receiving area 140. In an embodiment, the containment frame 110 forming the pallet storage area 120 is formed from one or more pallet magazines 300.

Figure 11:
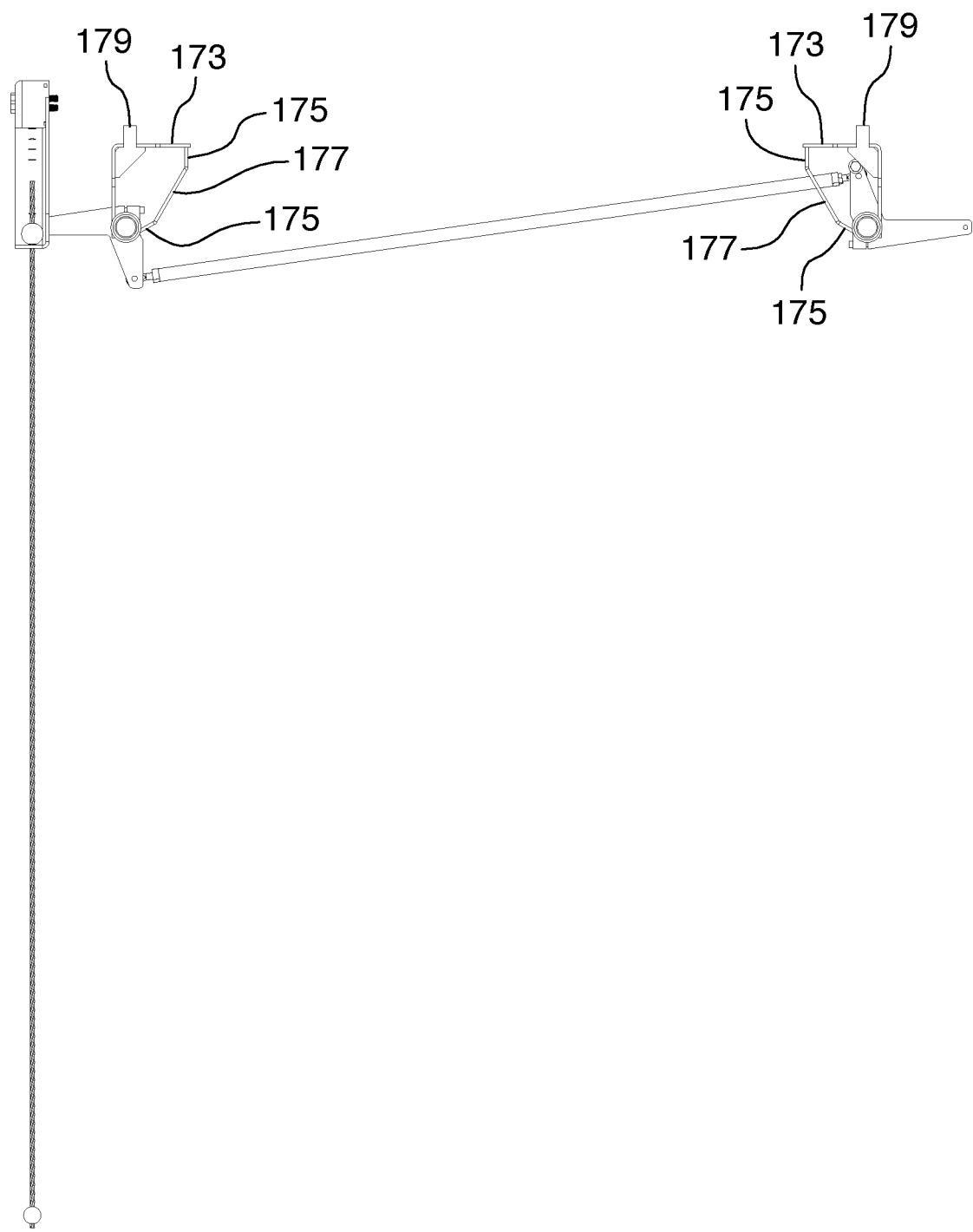
FIG. 11 is a front view of FIG. 10 with the support frame hidden.
Figure 19A:
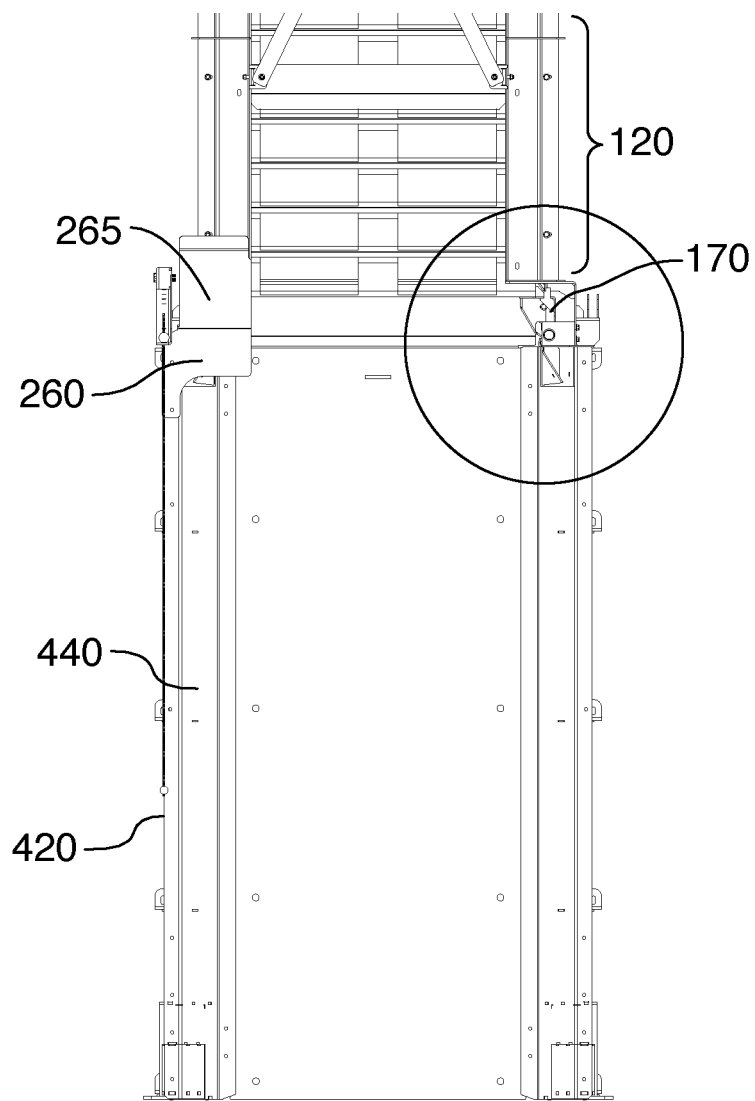
FIG. 19A is a front view of a pallet tower on completion of the step of loading pallets into the pallet storage area.
Figure 19B:
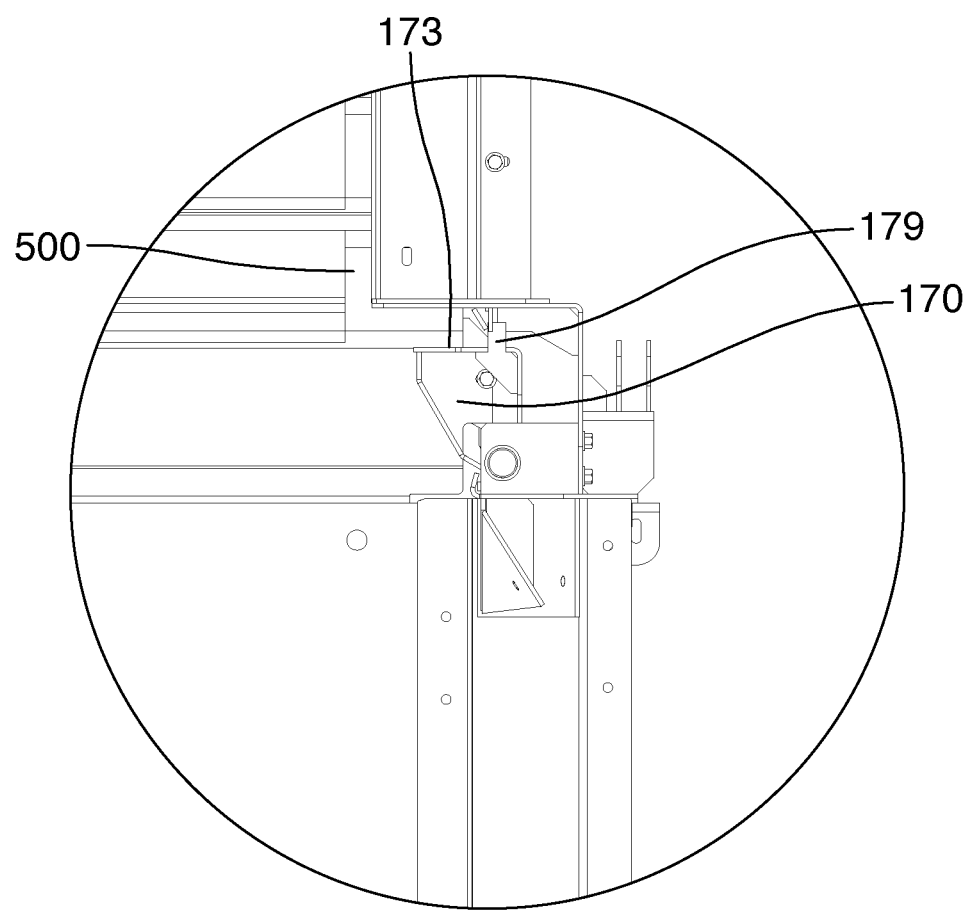
FIG. 19B is a detailed view of the support latch frame of FIG. 19A.

The containment frame 110 and base frame 130 are separated by a support latch frame 150 which is secured to the base frame 130. In another embodiment, the containment frame may be secured to the base frame, or both the base frame and the support latch frame. The support latch frame 150 has, preferably, a support latch 160 and a second support latch 170 which are moveable between an open configuration (FIG. 13) and a closed configuration (FIG. 11). The default position of the support latches 160, 170 is the open configuration. In the closed configuration, the bottommost pallet in the pallet storage area 120 rests upon the support latches 160, 170 and maintains the latches 160, 170 in the closed configuration via the weight of the pallet(s) within the pallet storage area 120 (as shown in FIG. 19B).

A latch pull chain 180 and latch pull chain arm 185 is connected to the support latch 160. In another embodiment, the latch pull chain arm may be attached to the second support latch 170. Also, the latch pull chain 180 may be actuated to move the support latches 160, 170 from the open configuration to the closed configuration.

Figure 13:
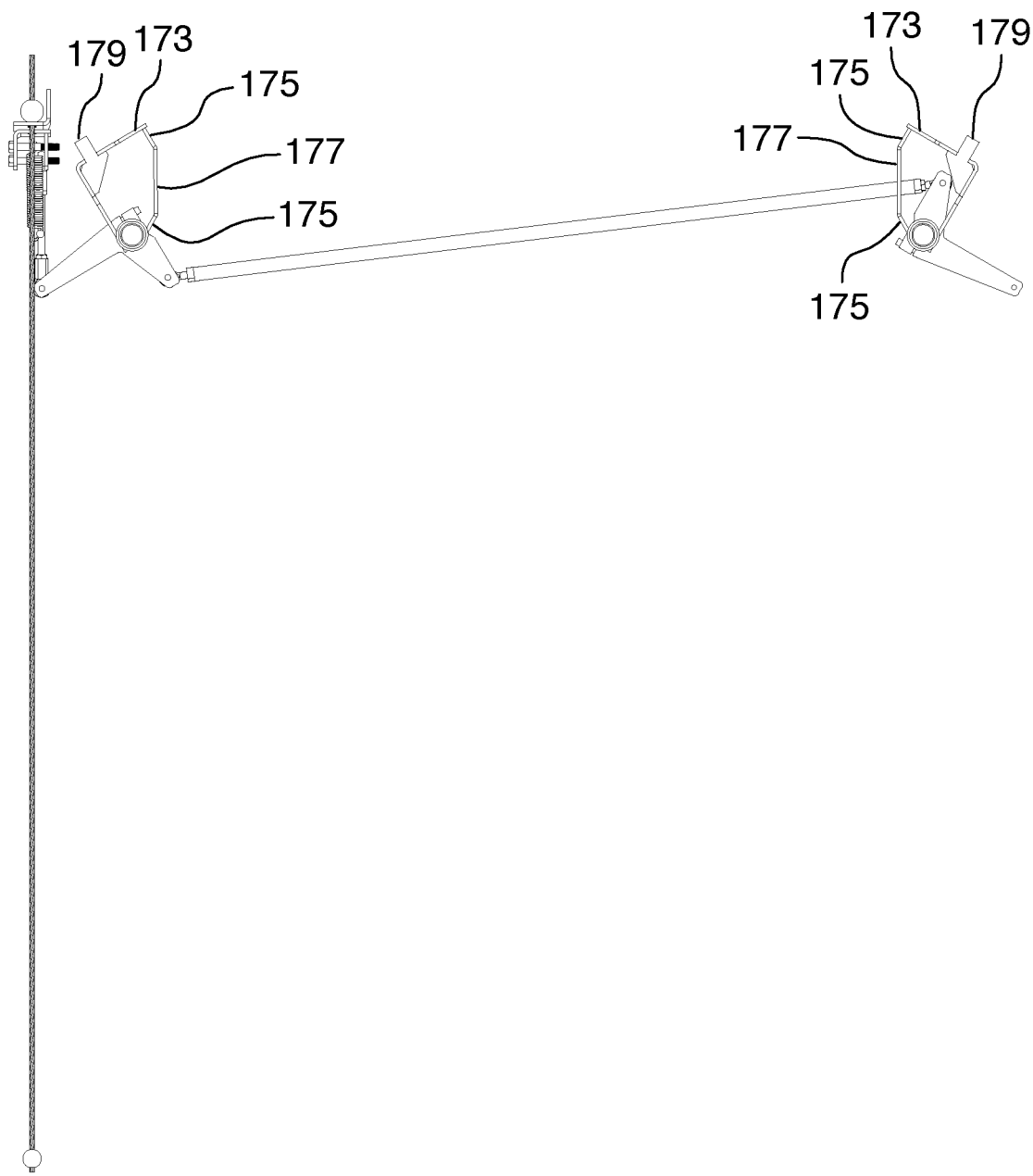
FIG. 13 is a front view of FIG. 12 with the support frame hidden.
Figure 14A:
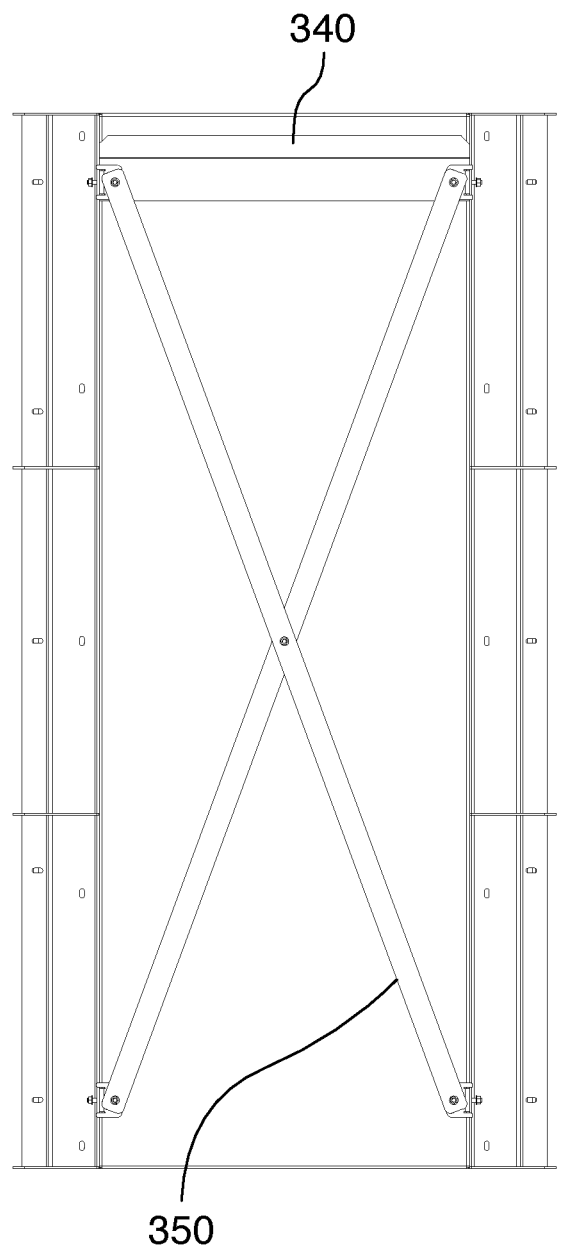
FIGS. 14A-D are front, side, top, and perspective views of a pallet magazine.
Figure 14B:
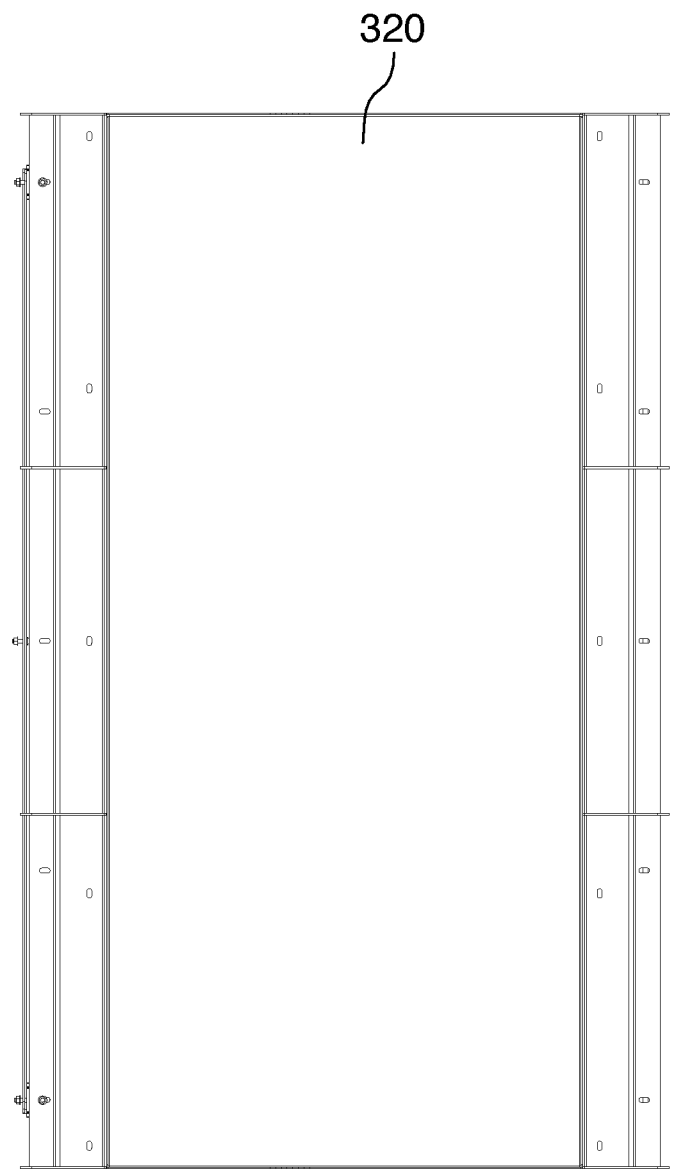
Figure 14C:
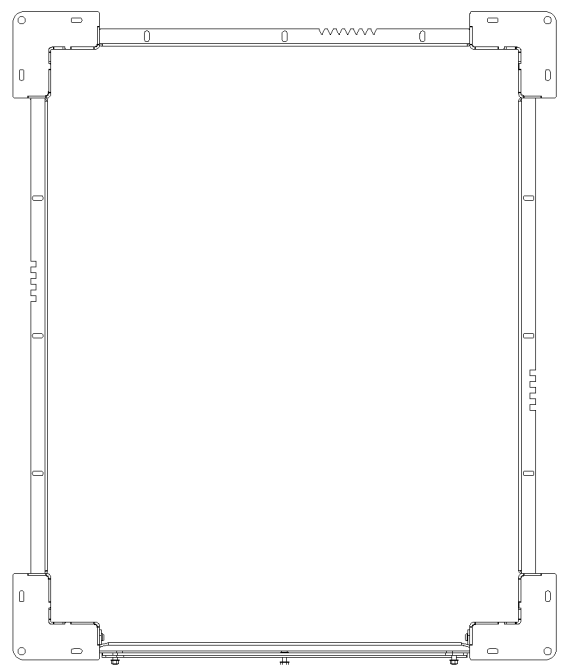
Figure 14D:
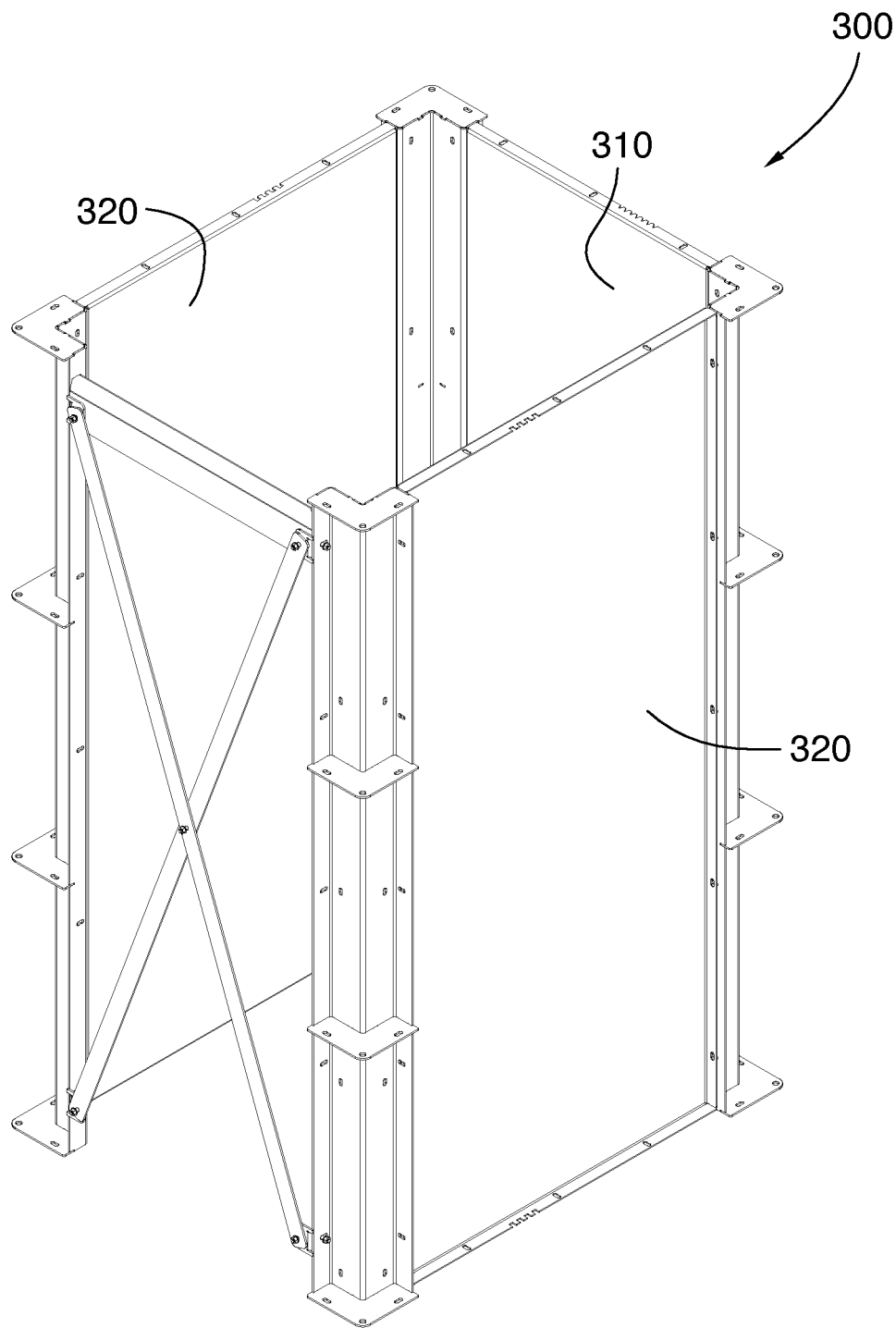
Figure 14E:
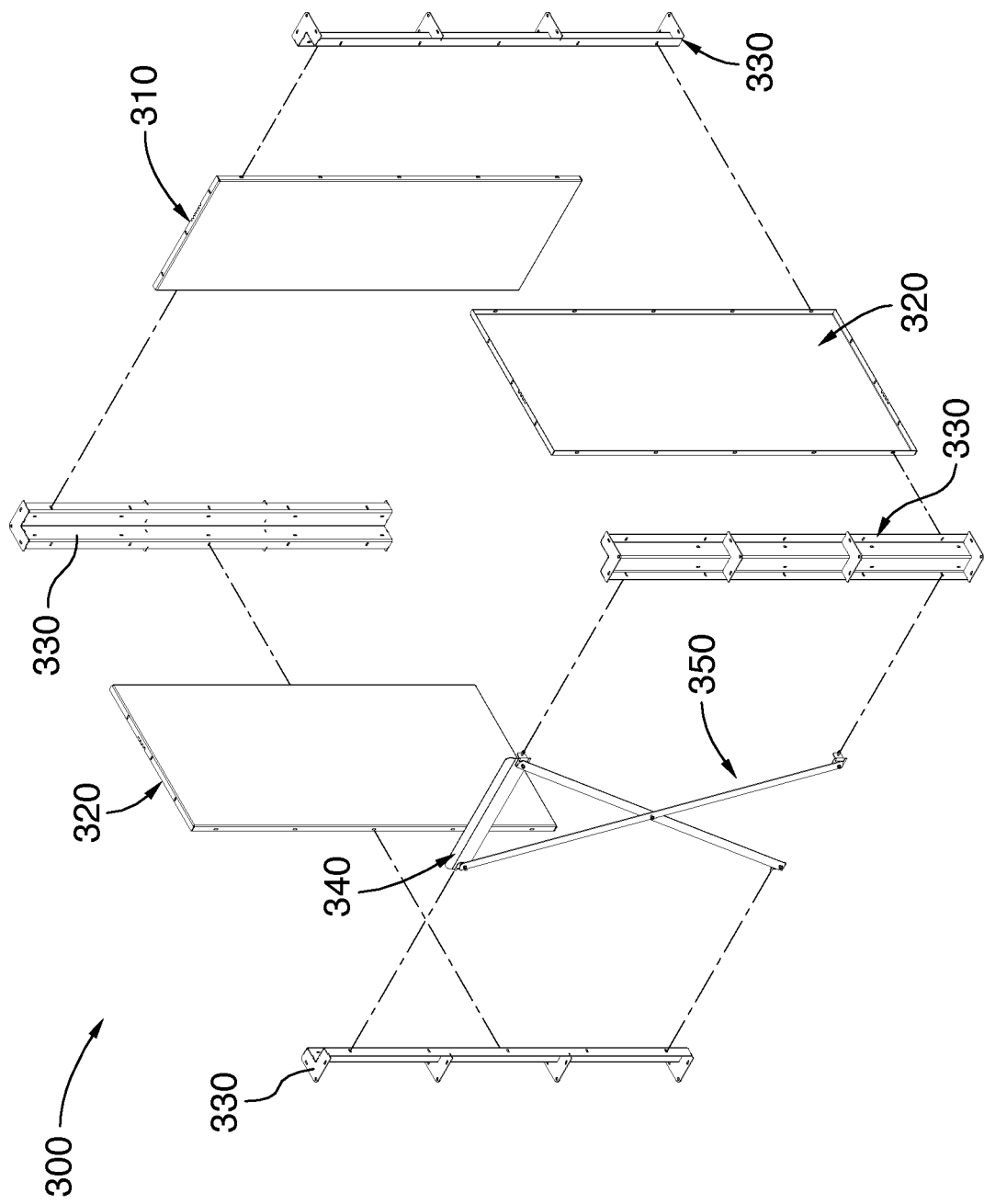
FIG. 14E is an exploded view of FIG. 14D.
Figure 15A:
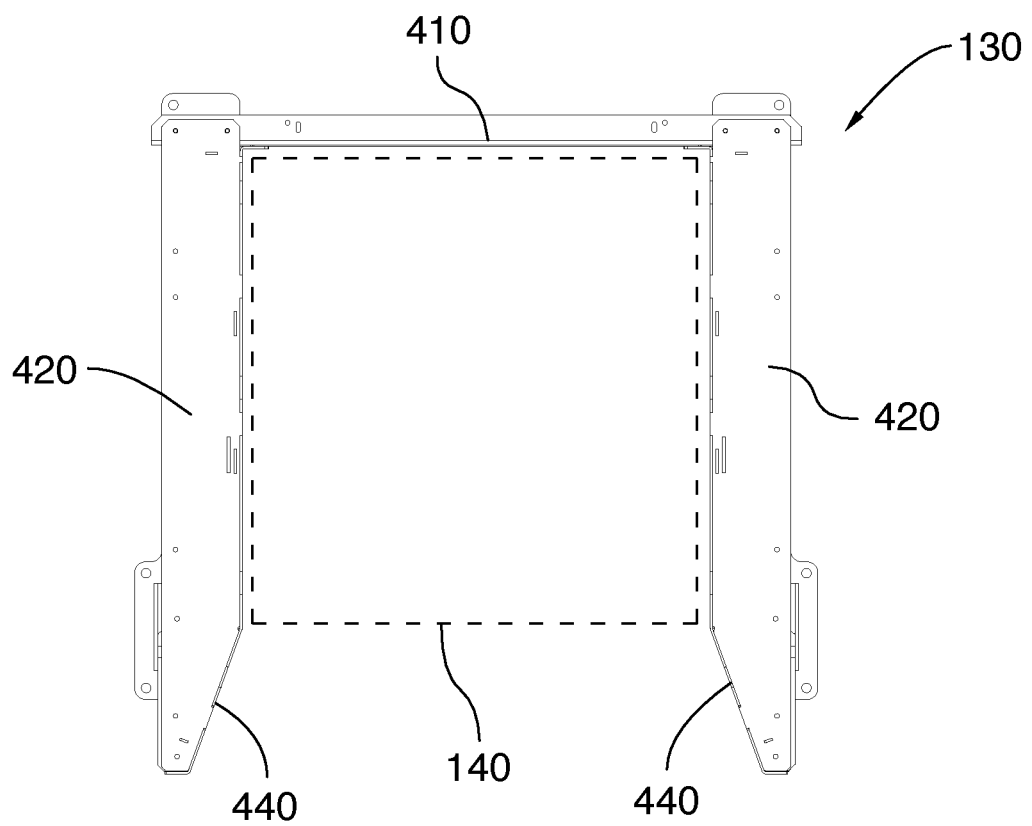
FIGS. 15A-D are top, front, side, and perspective views of a pallet alignment mechanism.
Figure 15B:
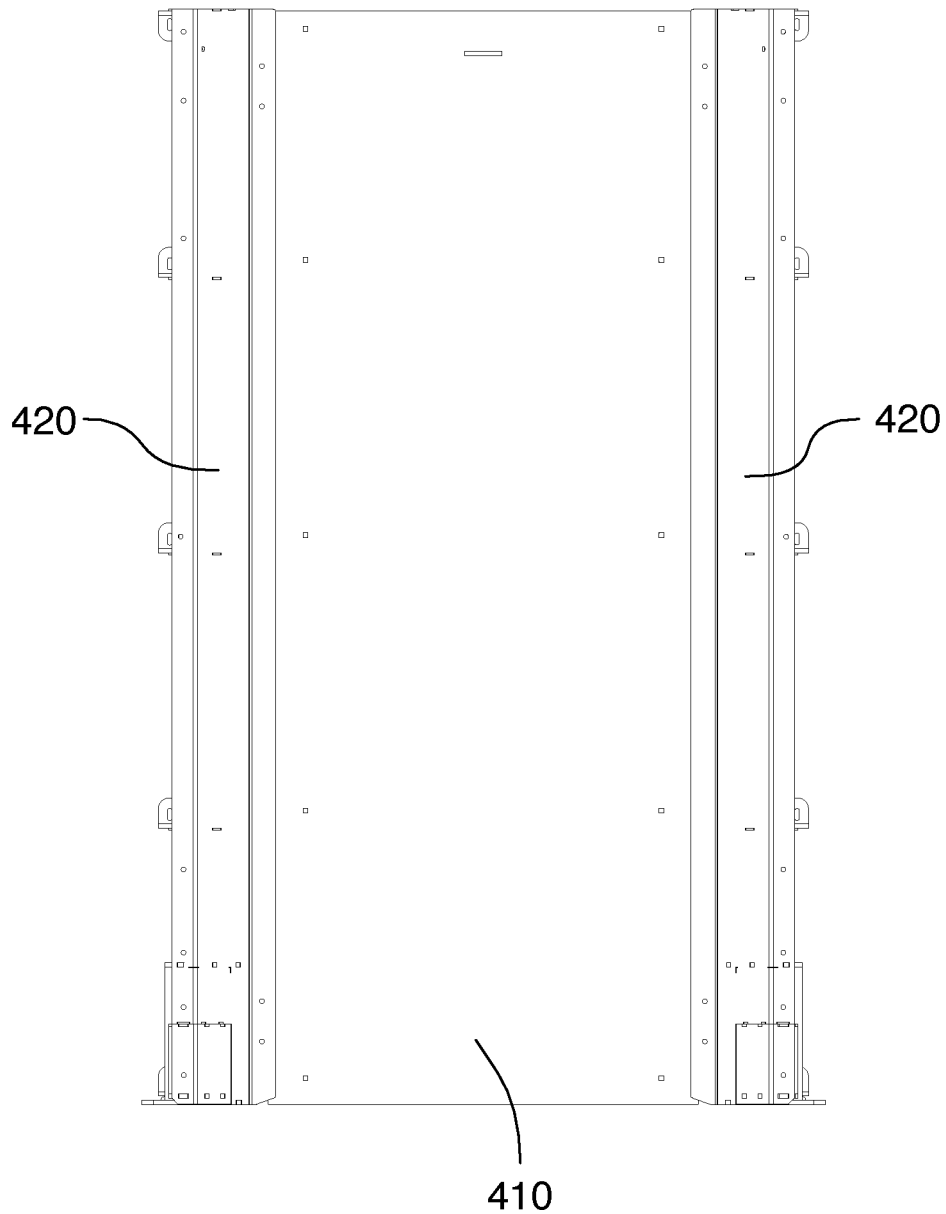
Figure 15C:
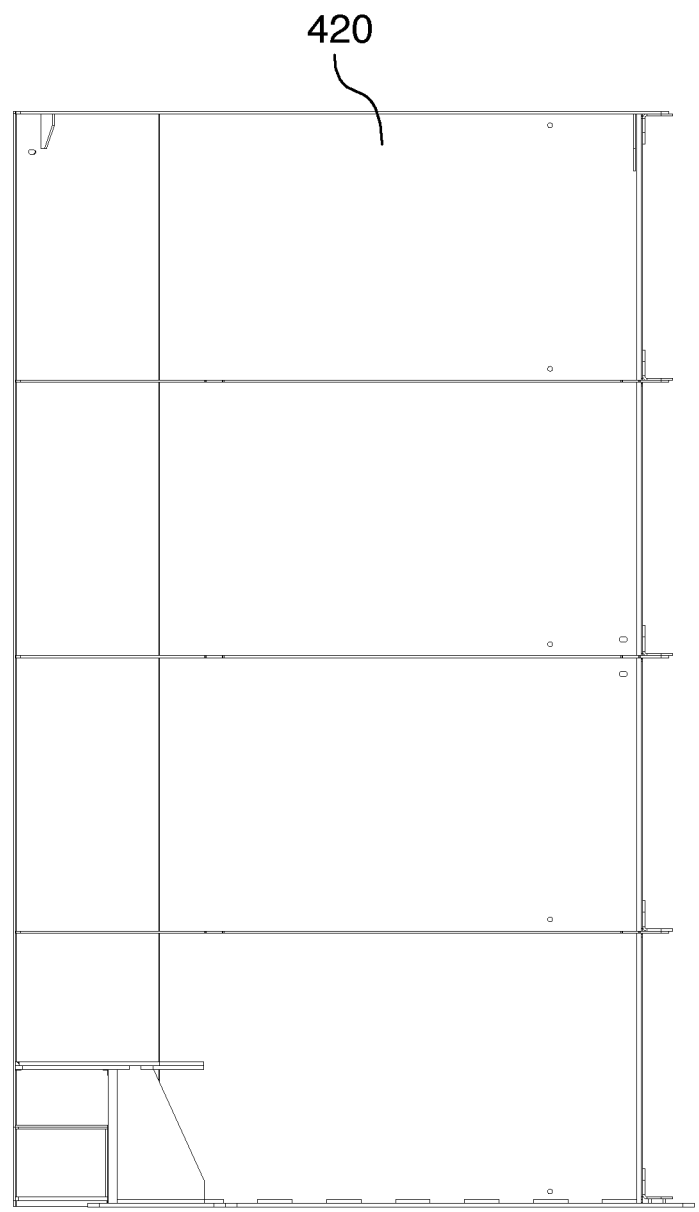
Figure 15D:
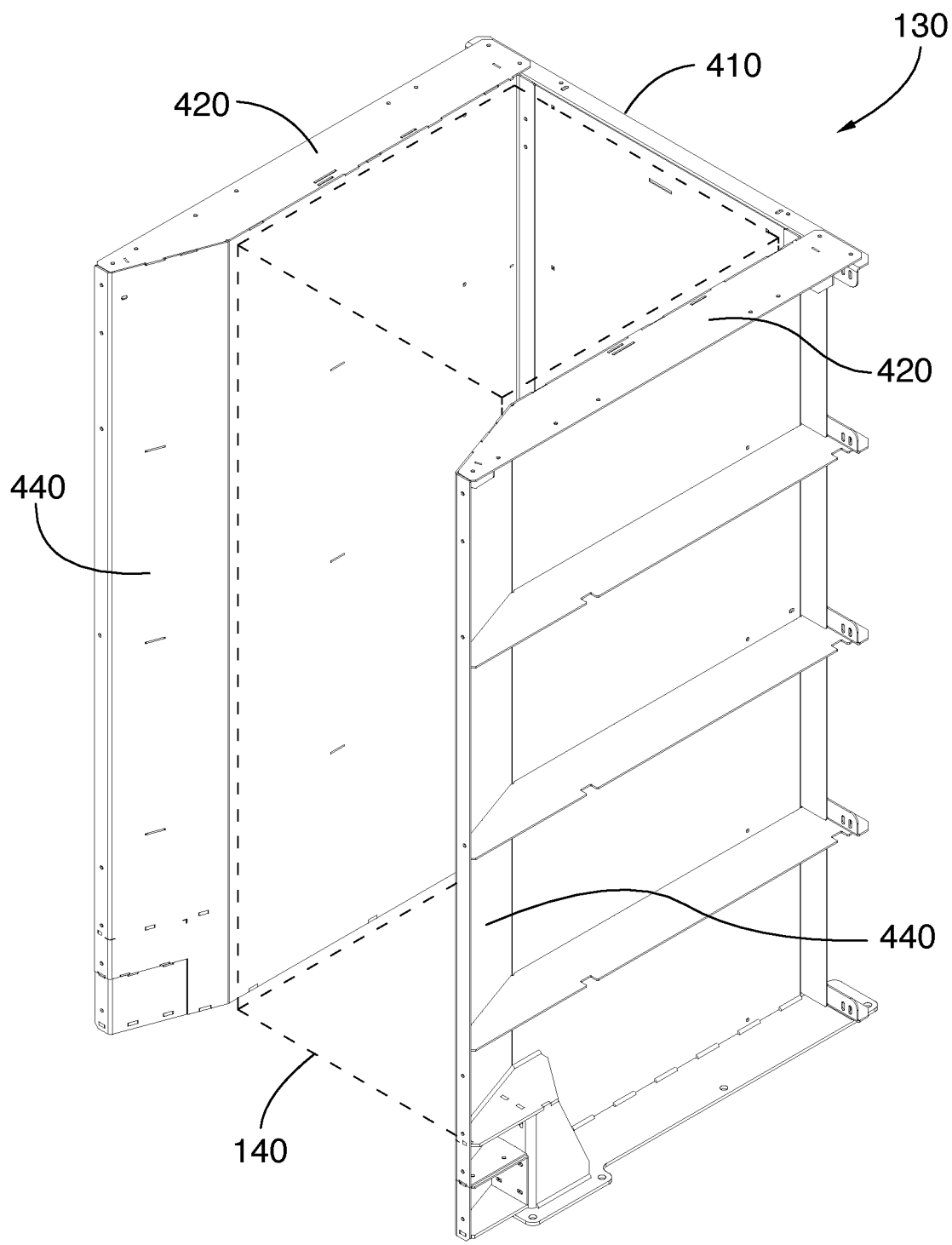
Figure 16A:
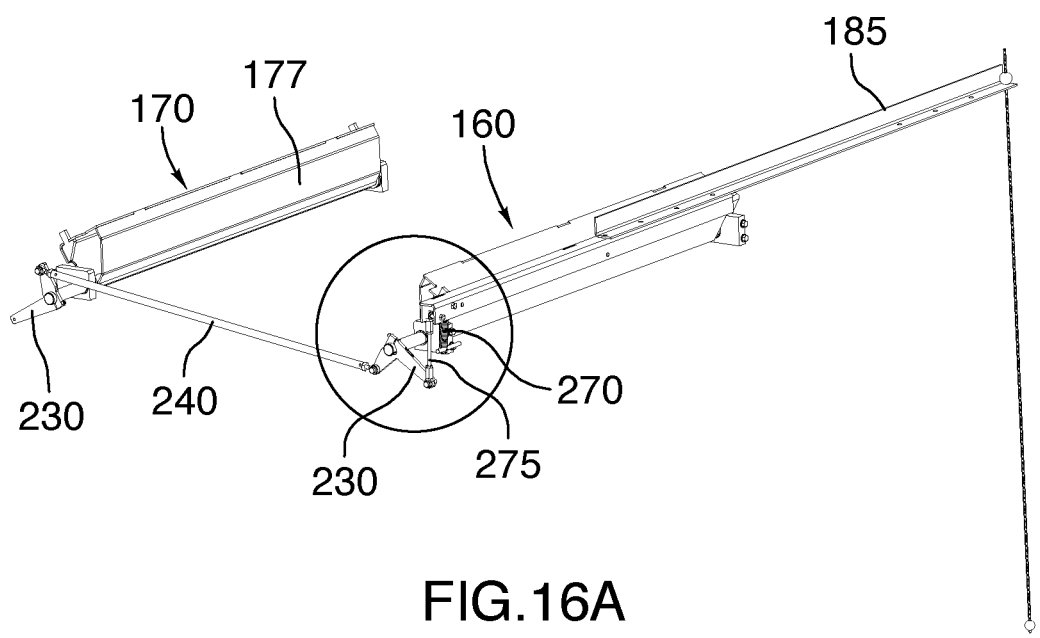
FIGS. 16A and 16C are rear perspective views of the support latch in the open and closed configurations with 16B and 16D corresponding close-up views of the latch pull chain arm connection to the support latch mechanism, 16E and 16F show corresponding close-up views with the support latch frame shown.
Figure 16B:
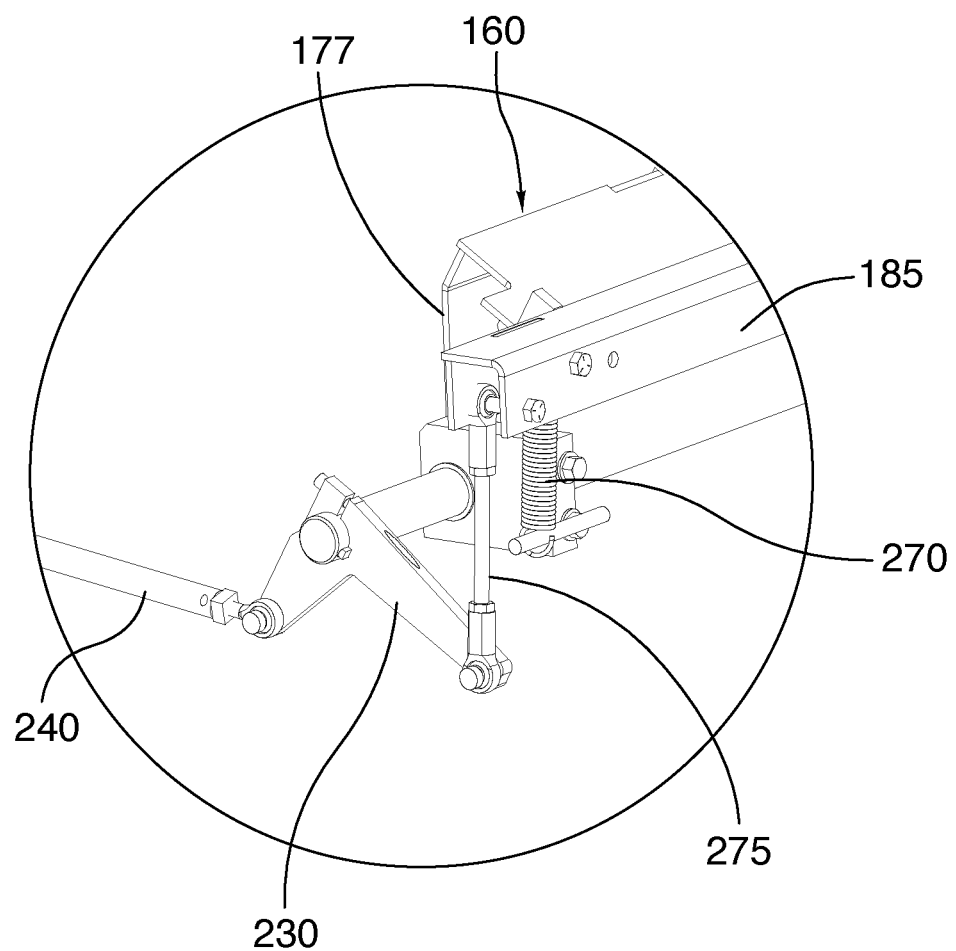
Figure 16C:
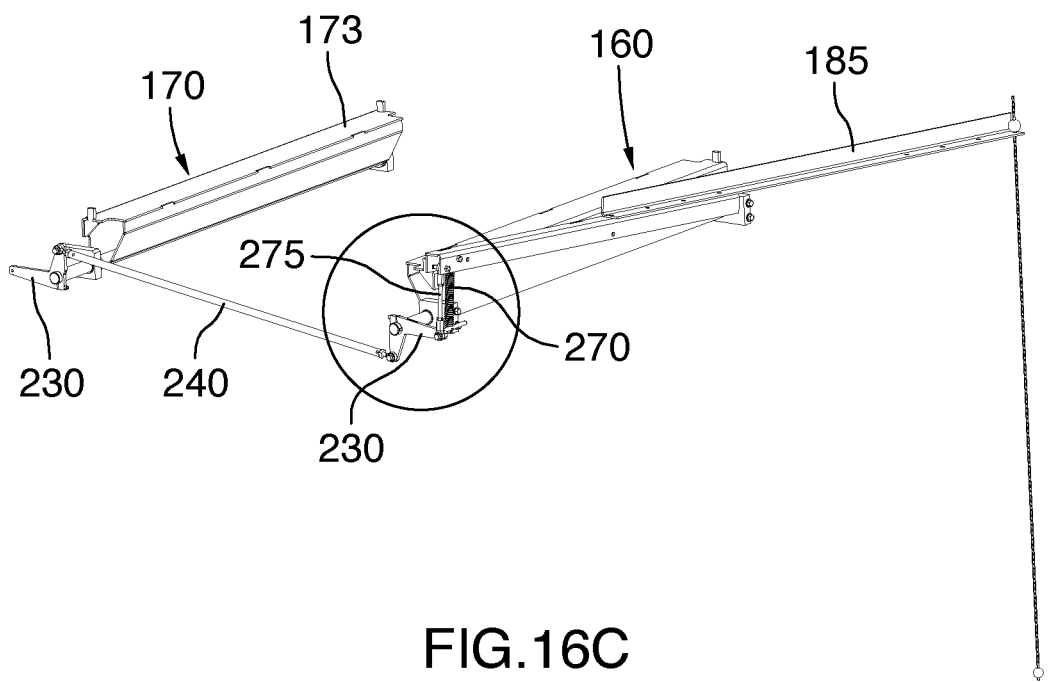
Figure 16D:
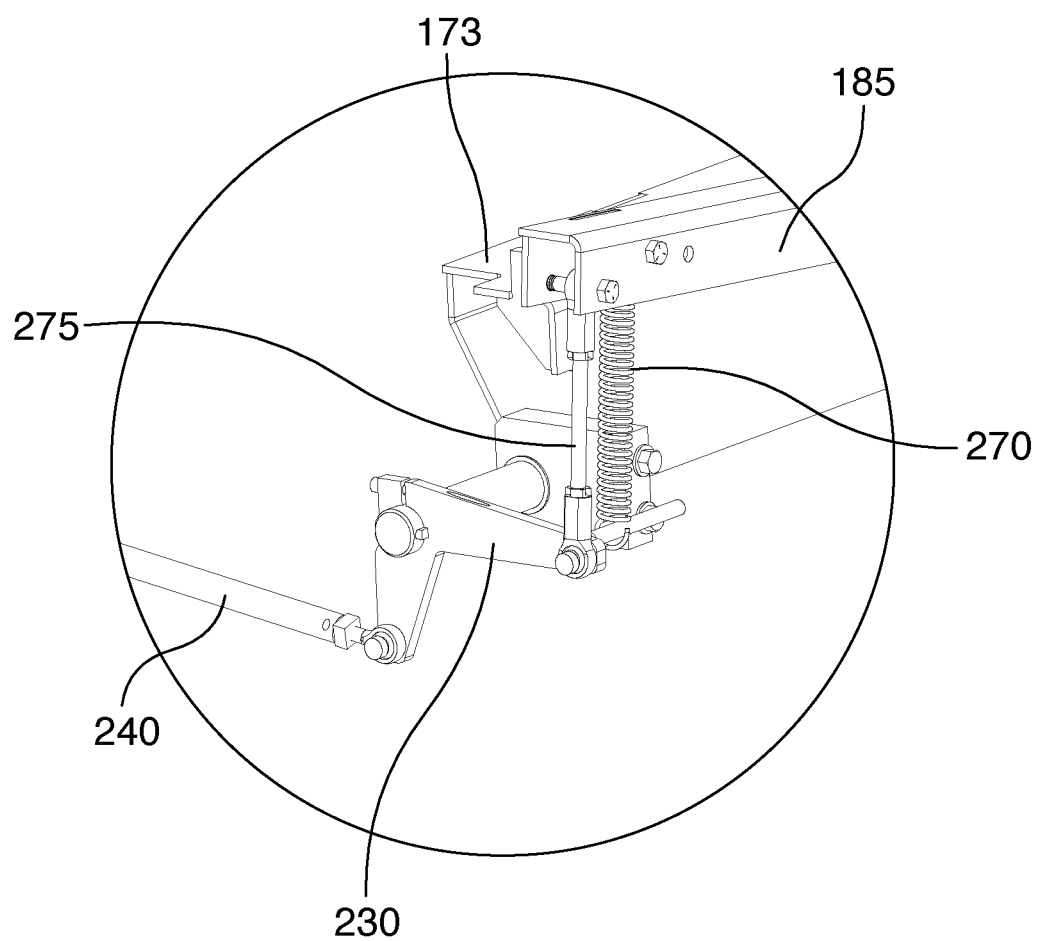
Figure 16E:
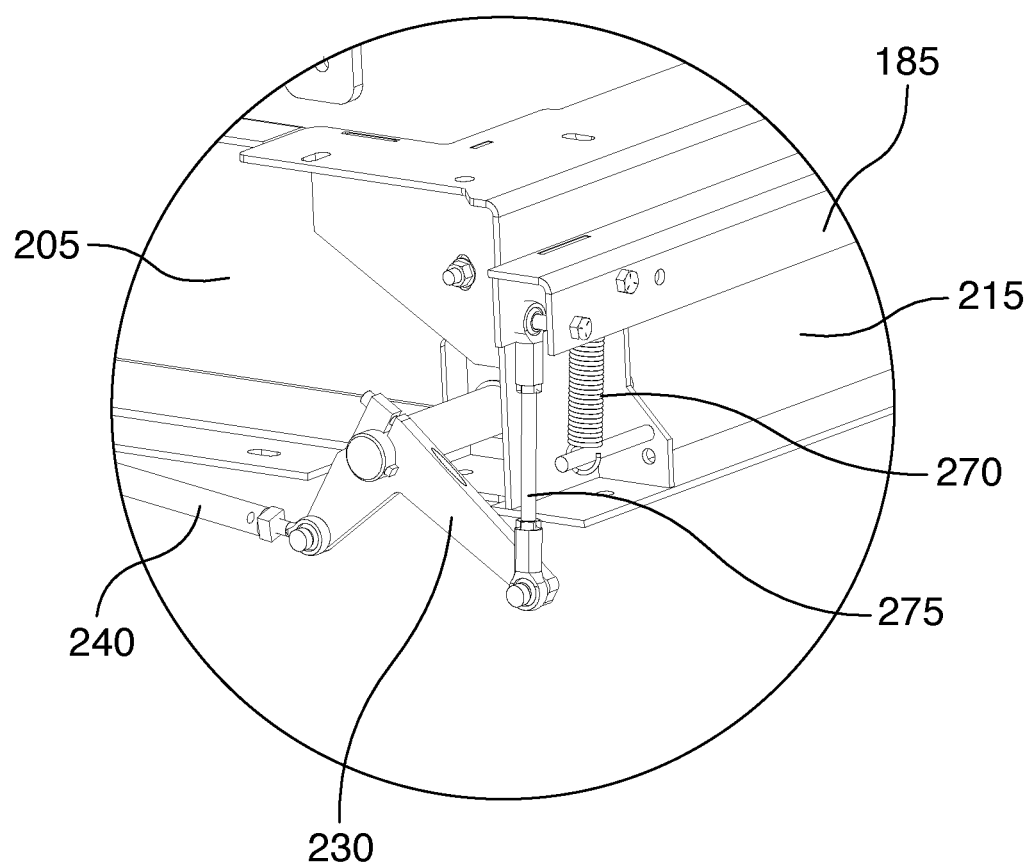
Figure 16F:
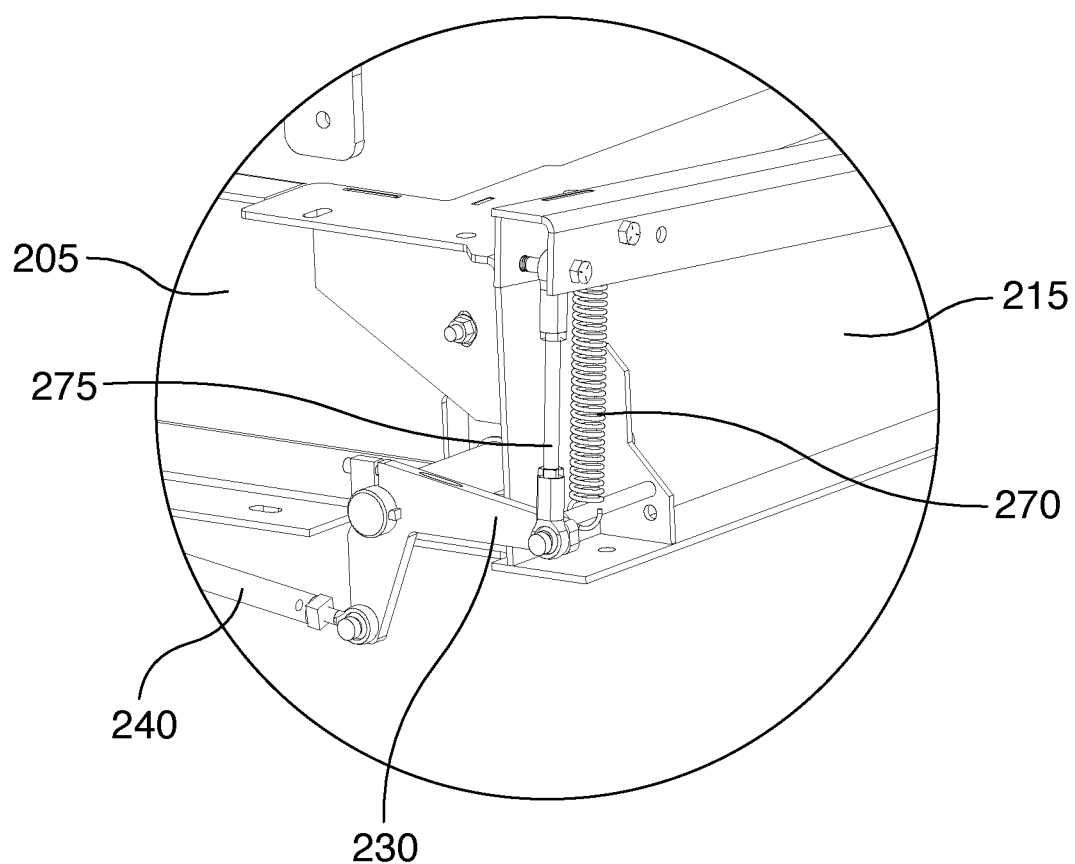

FIGS. 5-9 illustrate the support latch frame 150 in greater detail. The support latch frame 150 is formed from a rear support frame 205 and a pair of side support frames 215, 225. The support latches 160, 170 are respectively mounted to the side support frames 215, 225. The support latches 160, 170 pivot between the open position and the closed position via latch pivot block 250. In the closed position, the support latches 160, 170 provide a flat surface 173 for the pallet to rest on within the pallet storage area 120. Preferably, the support latches 160, 170 extend substantially along the length of the side support frames 215, 225 in order to substantially support the entire side edge of the bottom surface of the pallet by the flat surface 173. The pallet does not require side openings in order to be supported by the support latches. The pallet may or may not have side openings and will function with the pallet tower. Referring now to FIGS. 11 and 13, the support latches 160, 170 may further comprise a chamfered edge 175 on the guide surface 177 to provide a guide for vertical movement of the pallet, and to prevent the pallet from catching on the support latches 160, 170 during movement of the pallet, in both directions, between the pallet storage area 120 and the pallet receiving area 140.

One of the support latches (160 as shown) is connected to latch pull chain 180 via latch pull chain arm 185. Support latches 160, 170 are respectively coupled to latch connector arms 230, which are further coupled to each other via latch connector bar 240 to enable cooperative movement of the support latches 160, 170 upon actuation of latch pull chain arm 185 by the latch pull chain 180. The latch connector bar 240 and latch arms are shown in greater detail in FIGS. 16A-F.

The latch pull chain arm 185 is coupled to latch connector arm 230 via a rod 275. The latch pull chain arm 185 is also attached to a spring 270. The other side of the spring 270 is connected to the side support frame 215 by a projection. The latch pull chain arm 185 is pivotally mounted (at 217) to the side support frame 215. In the default operating position, that is the open configuration, the spring 270 pulls the rear of the latch pull chain arm 185 down towards the side frame 215 and the rod 275 pivots the latch connector arm 230 to rotate and hold the support latch 160 in the open configuration. Support latch 170 is similarly rotated and held in an open configuration via latch connector bar 240 and corresponding latch connector arm 230. The rotation limiting protrusion 179 defines the amount of rotation of the support latches 160 and 170 as shown in FIGS. 19B and 20B. As shown in FIG. 19B, the rotation limiting protrusion 179 is stopped by a protrusion from the frame to define the closed configuration. As shown in FIG. 20B, the rotation limiting protrusion is stopped by the side support frame to define the open configuration.

When latch pull chain 180 is pulled down by the operator, latch pull chain arm 185 pulls on spring 270 and moves rod 275 to rotate the support latch 160 into the closed configuration. Support latch 170 is similarly moved into the closed configuration via the latch connector arms 230 and latch connector bar 240. Latch pull chain 180 must be held by the operator to maintain the closed configuration until the pallet is lowered onto the flat surface 173 of the support latches 160, 170, whereby the weight of the pallet holds the support latches 160, 170 in the closed configuration and the latch pull chain 180 may be released by the operator. The latch pull chain arm 185 will then remain in a lowered position.

While the spring 270 and rod 275 assembly is shown on side support frame 215, it may equally be mounted to side support frame 225 along with latch pull chain 180 and latch pull chain arm 185 to provide equivalent functionality on the opposite side. In another embodiment, two latch pull chain arms 185 may be mounted one on each side support frame 215 and 225.

Figure 9:
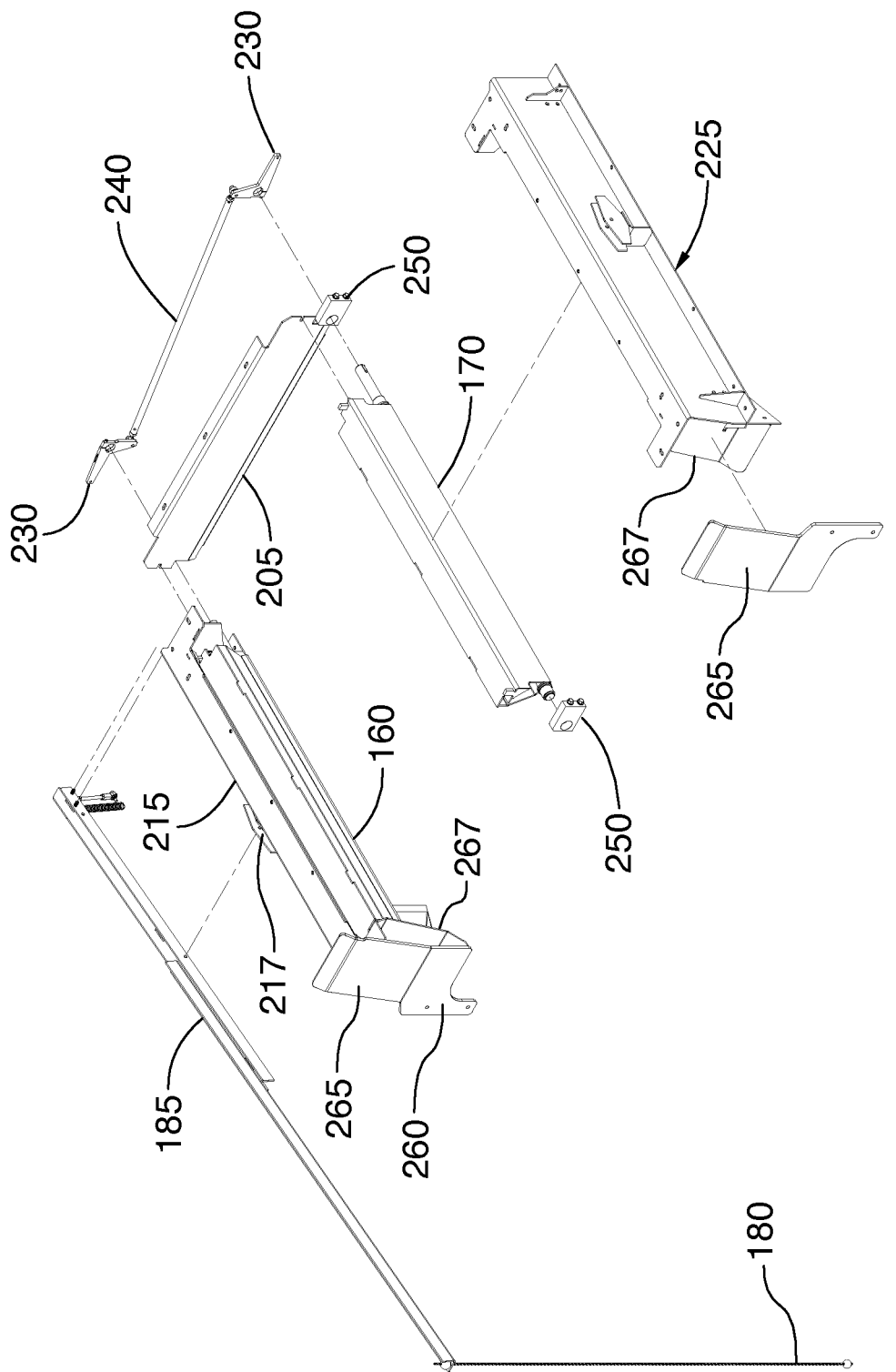
FIG. 9 is an exploded view of FIG. 8.
Figure 23A:
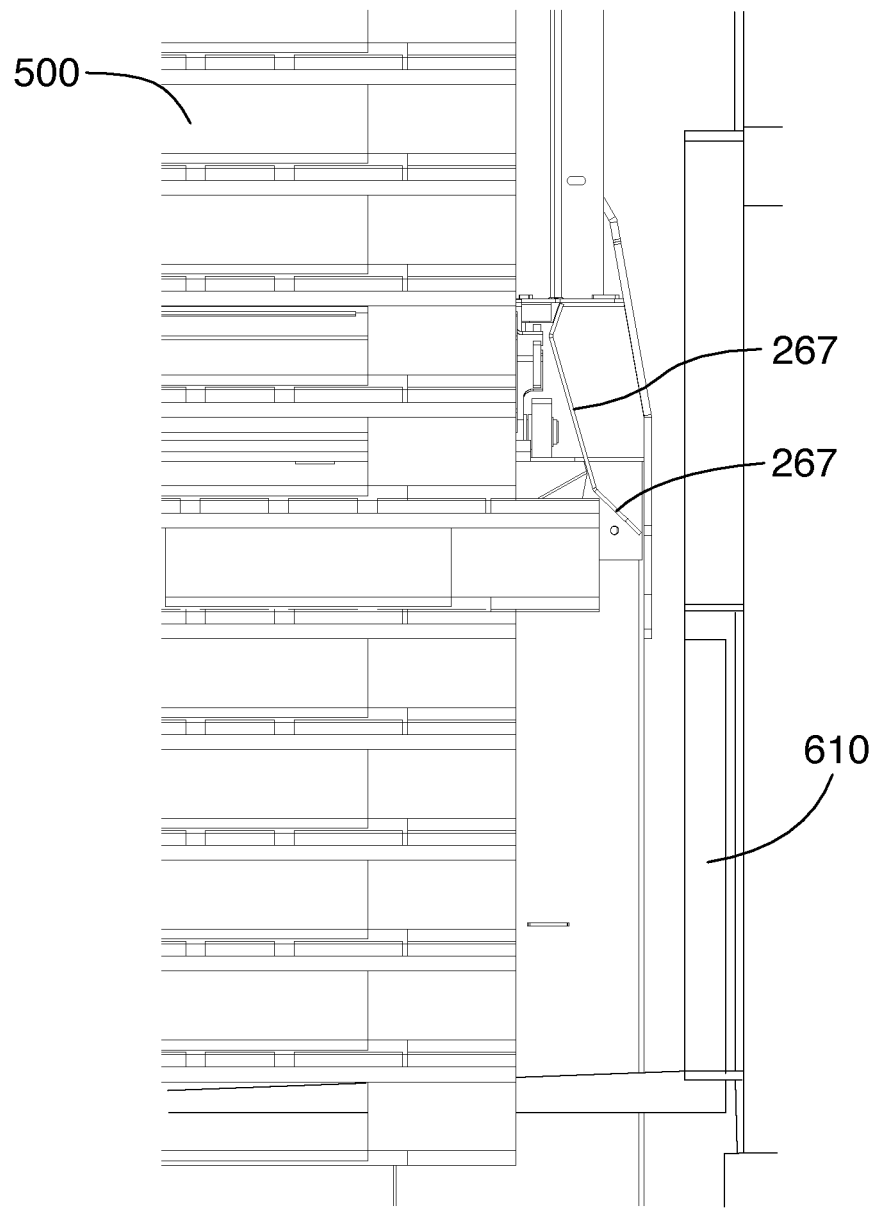
FIGS. 23A and 23B are side views of pallets aligning front-to-back as the pallet stack moves from the pallet receiving area to the pallet storage area.
Figure 23B:
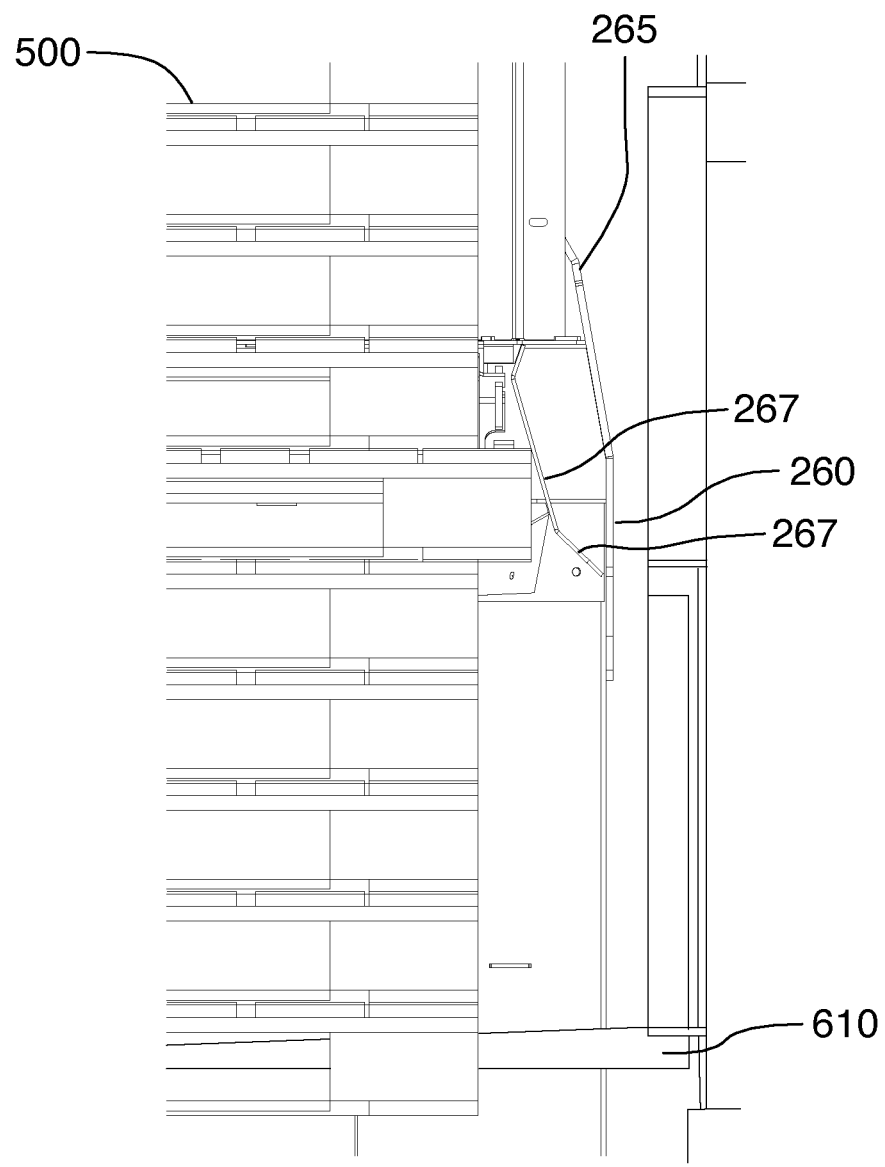
Figure 24:
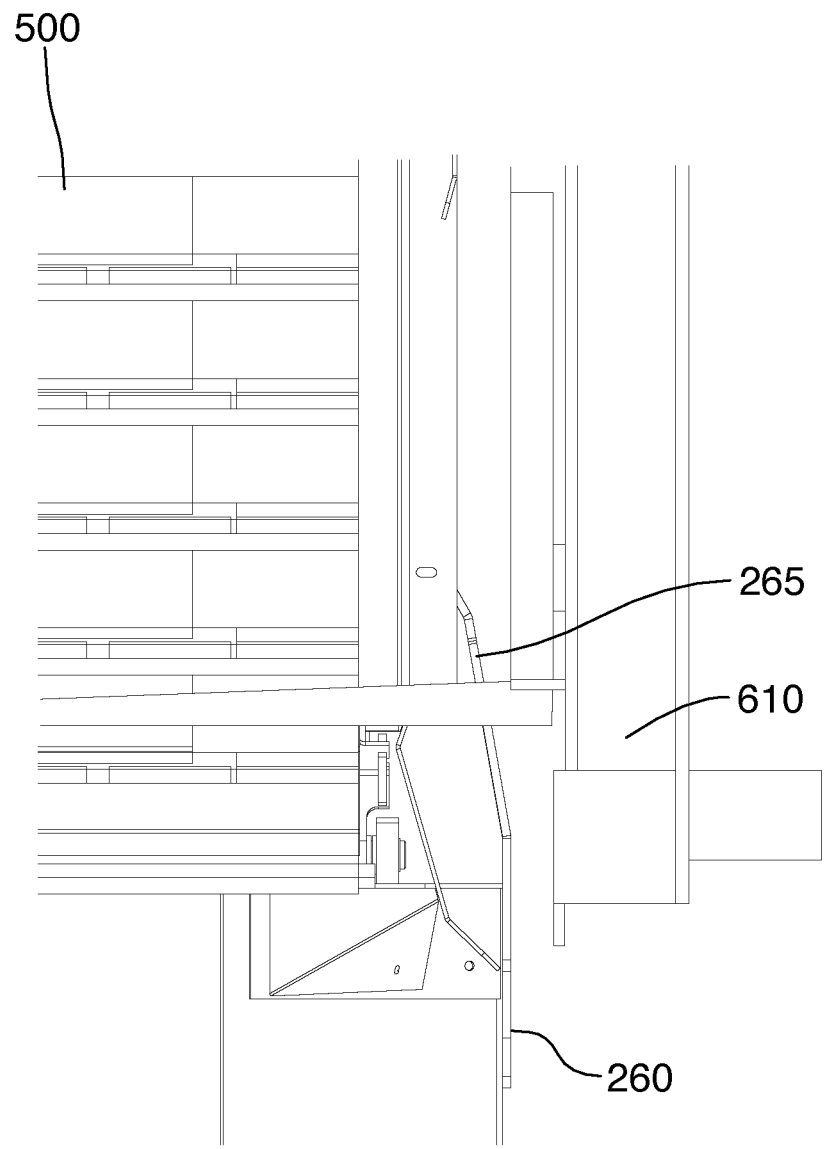
FIG. 24 is a side view of a forklift lowering pallets into the pallet retaining area.

The front of the support latch frame 150 is protected by a set of bump stops 260 which prevent the mast 610 of the forklift from impacting on the side support frames 215, 225, and/or the latch pivot block 260 as shown in FIGS. 9, 23A and 23B.

Figure 10:
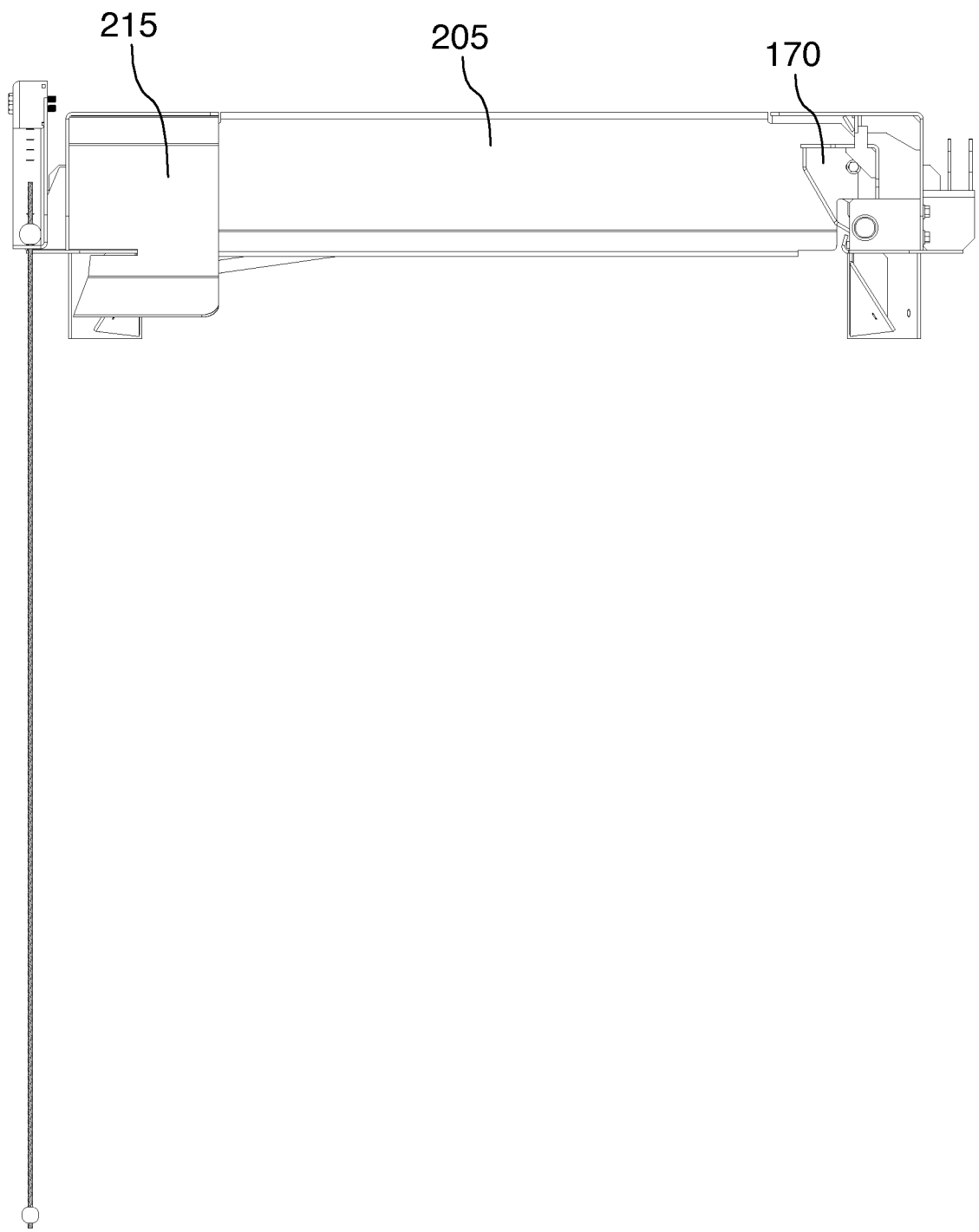
FIG. 10 is a front view of FIG. 5 with the support latches in a closed position and with front of side support frame shown on one side.
Figure 12:
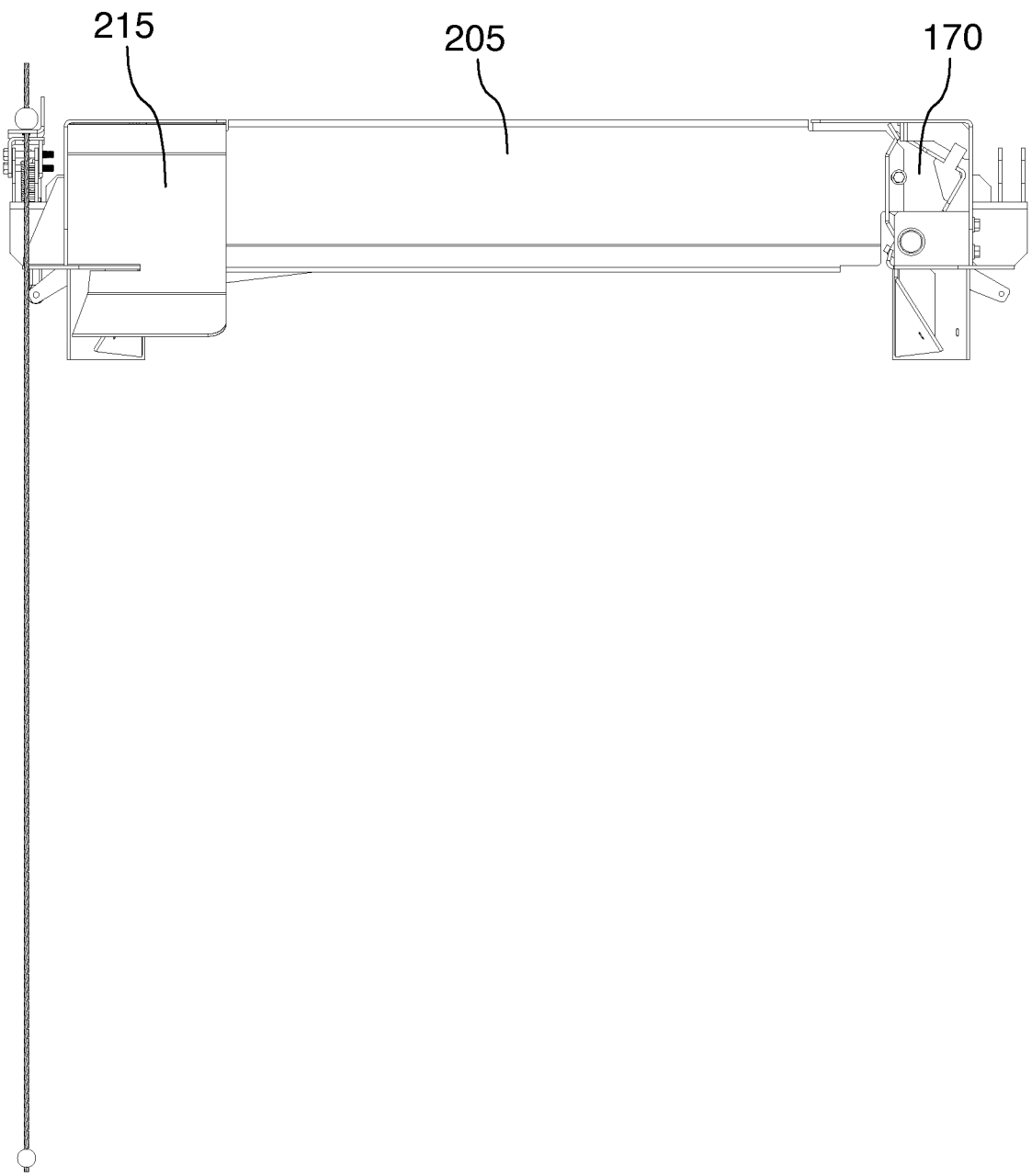
FIG. 12 is a front view of FIG. 5 with the support latches in an open position and with front of side support frame shown on one side.

Thus, the support latches 160, 170 are moveable between a closed position, as shown in FIGS. 10 and 11, and an open position, as shown in FIGS. 12 and 13. In the closed position, pallets are supported within the pallet storage area 120 by resting upon support latches 160, 170 in the closed position. The support latches 160, 170 are spring biased to default to the open position in order to more readily enable movement of pallets into the pallet storage area 120. Thus, to remove pallets, as discussed in detail below, when the weight of the pallet is removed, the support latches 160, 170 will automatically return to the open position.

FIGS. 14A-E illustrate a pallet magazine 300. The pallet storage area 120 is formed from one or more pallet magazines 300 within the containment frame 110. As shown, in an embodiment, the pallet magazine 300 is formed from a rear panel 310 and a pair of side panels 320 connected via corner pieces 330. As shown, the front is formed from a crossbar 340 and a pair if diagonal crossbeams 350 to provide structural stability while permitting viewing the interior of the pallet magazine to determine the number of pallets within. In another embodiment, the front, side, and rear panels may be solid. In another embodiment the front, side, and rear panels may be formed from a cross bar and diagonal crossbeams. In yet another embodiment, the front, side, and rear panels may be solid or formed from a cross bar and diagonal crossbeams.

Figure 25:
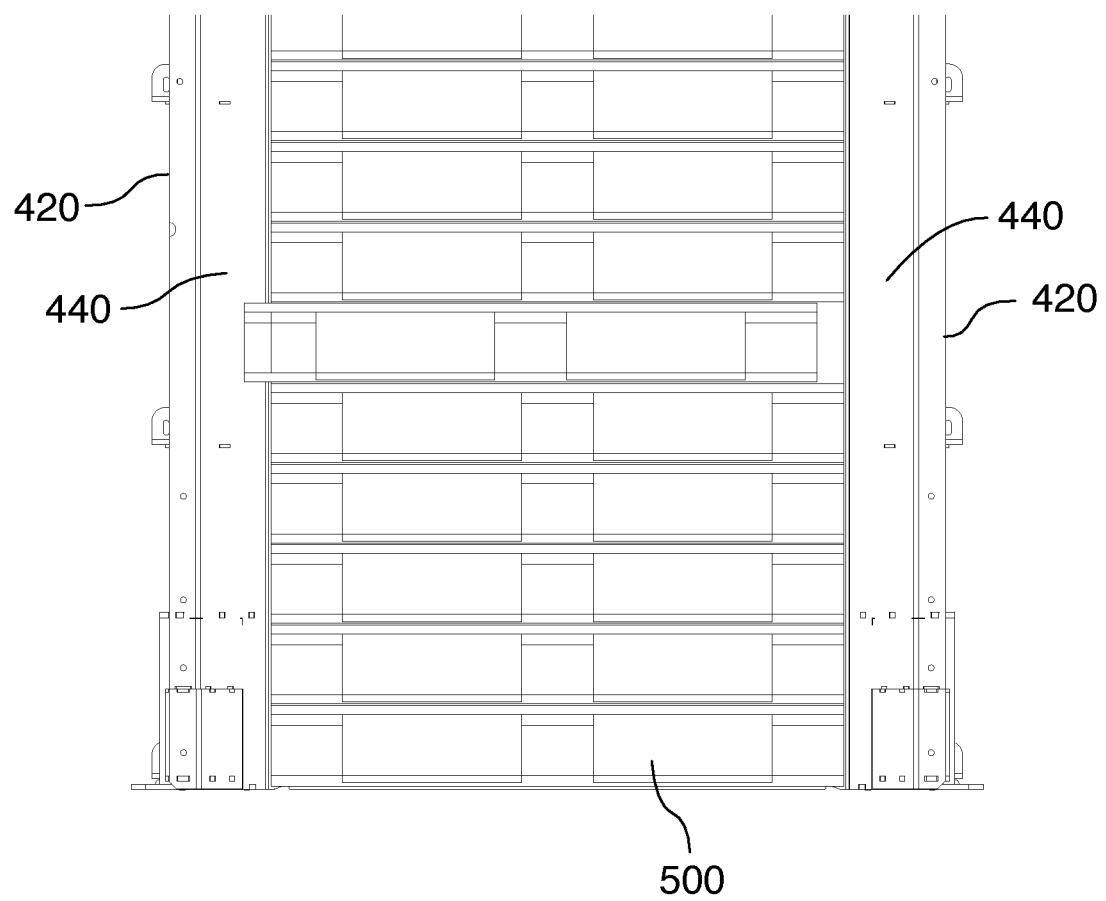
FIG. 25 is front view of the pallet receiving area with pallets aligning side-to-side.

FIGS. 15A-E illustrate the base frame 130 which creates the pallet receiving area 140. The base frame is formed from a rear wall 410 and side walls 420, connected via rear crossbars 430. The side walls 420 have chamfered edges 440 on the entrance opening of the pallet receiving area 140 to provide for side-to-side alignment of the pallets are as they enter the pallet receiving area 140 as shown in FIG. 25.

Figure 17A:
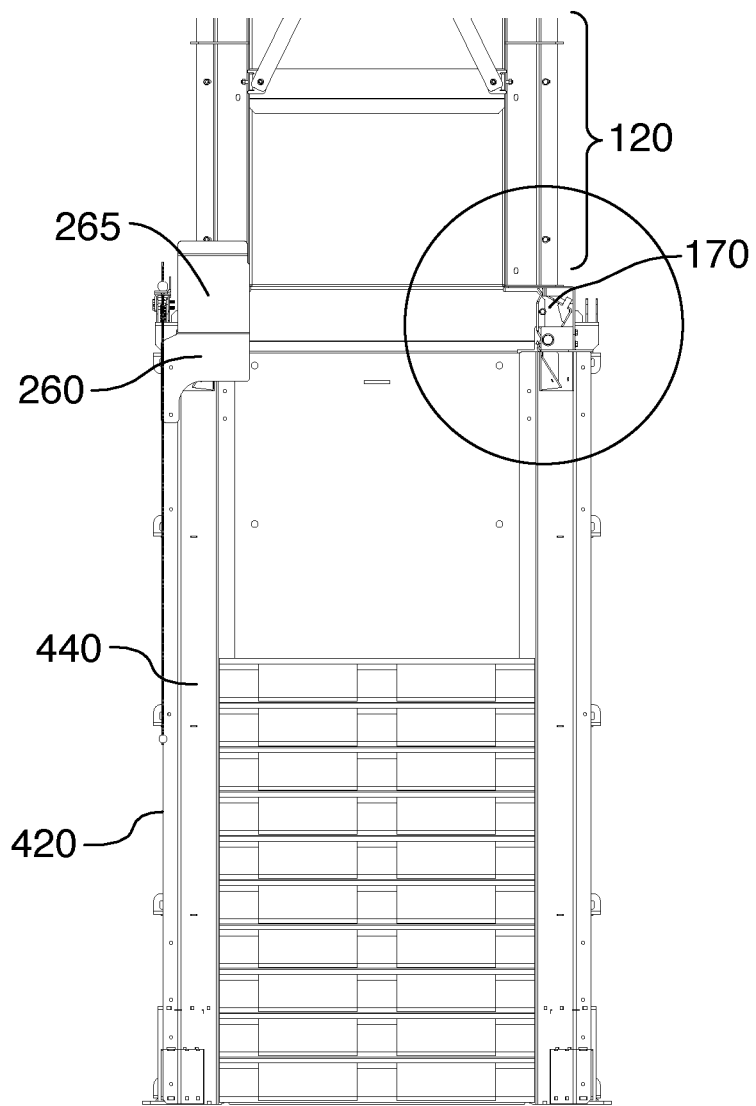
FIG. 17A is a front view of a pallet tower with pallets in the pallet receiving area.
Figure 17B:
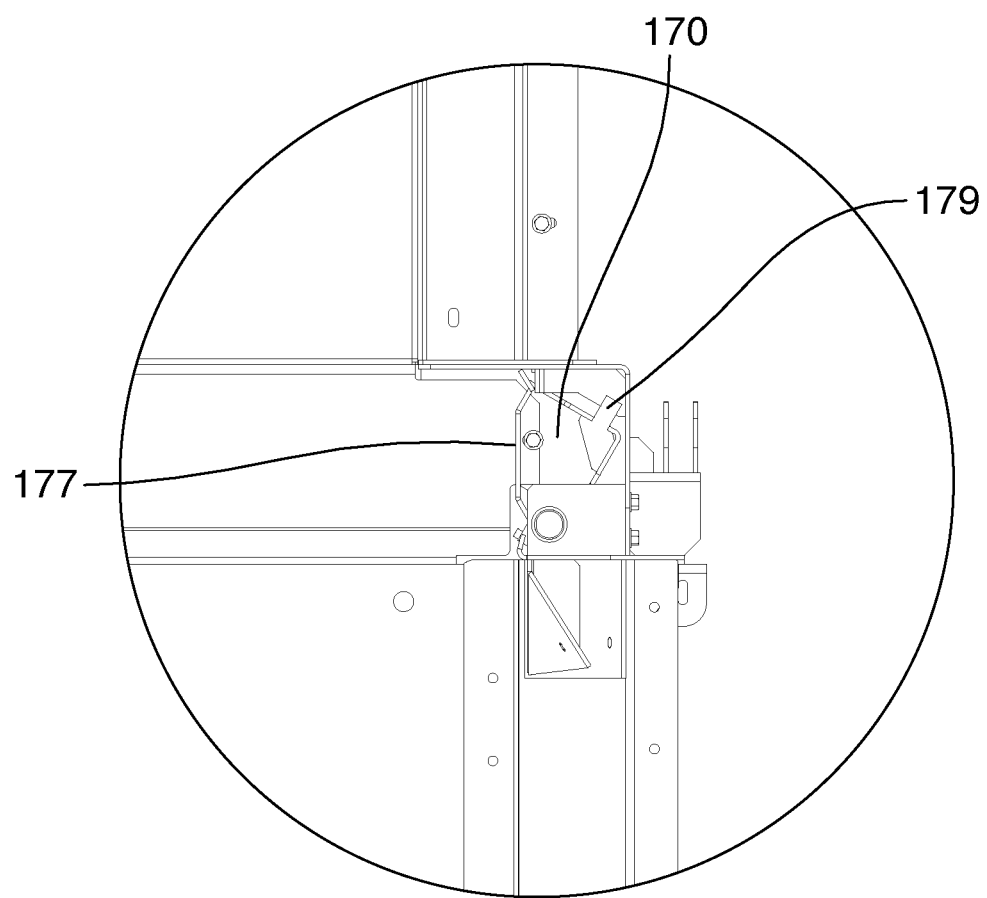
FIG. 17B is a detailed view.
Figure 18A:
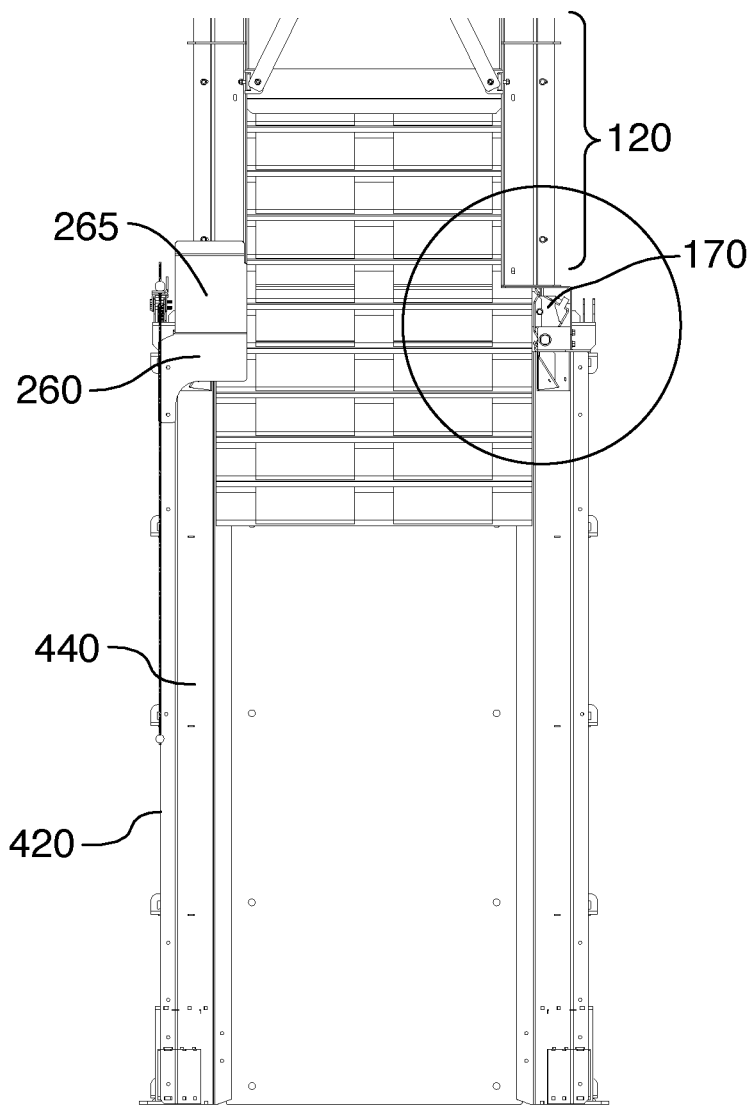
FIG. 18A is a front view of a pallet tower during an intermediate step of lifting pallets into the pallet storage area.
Figure 18B:
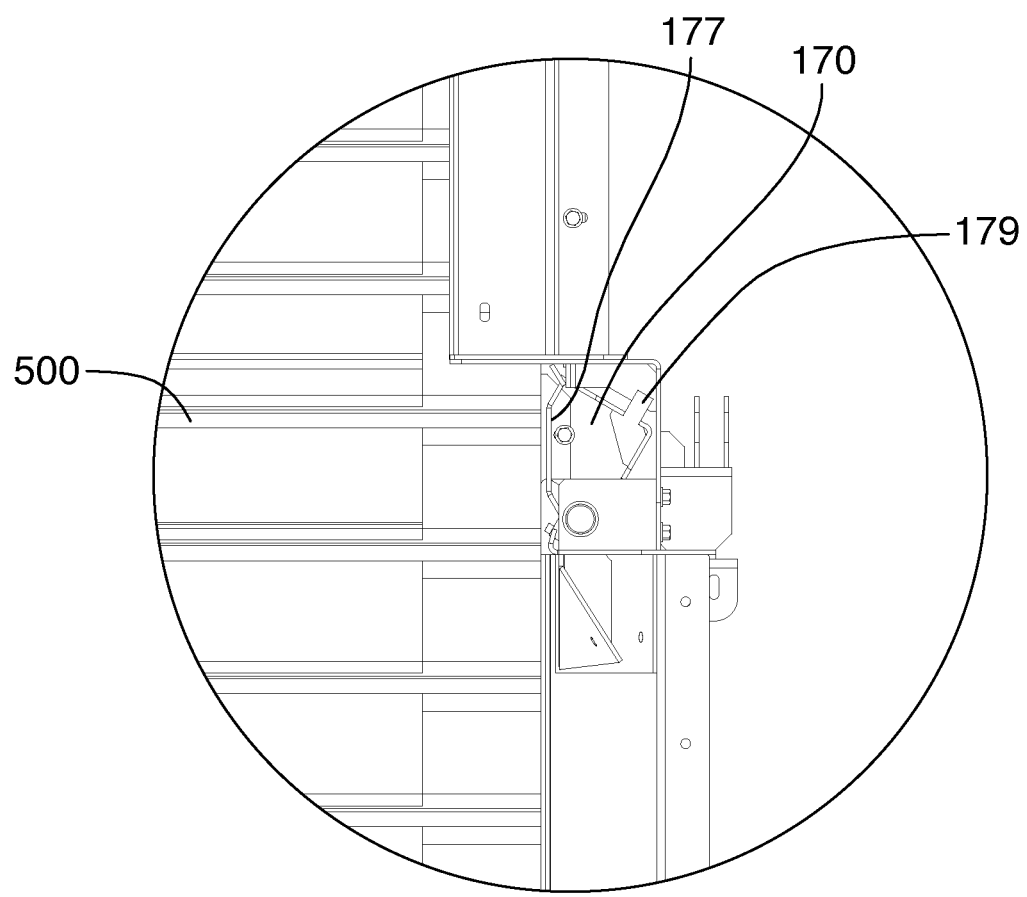
FIG. 18B is a detailed view of the support latch frame of FIG. 18A.

In operation, pallets 500 are loaded into the pallet receiving area 140 as shown in FIG. 17A. The pallets are aligned in a side-to-side orientation via chamfered edges 440 on side walls 420 as shown in FIG. 25. The pallets are further aligned in a front-to-back orientation by pushing the pallets with the forklift against the rear wall 410 of the pallet receiving area, until the forklift mast 610 hits the bump stop 260. Referring to FIGS. 23A and 23B, the interior alignment surface 267 assists in aligning a pallet in the pallet stack 500 as it moves from the pallet receiving area 140 to the pallet storage area 120. In an embodiment, the interior alignment surface 267 aligns the pallet of the pallet stack 500 from front to back. In an embodiment, the interior alignment surface 267 may align a pallet in the pallet stack 500 by about 0.5 inch to about 1 inch from front to back. As shown, pallet storage area 120 is empty, thus the support latches 160, 170 are in the default open position as shown in FIG. 17B. The pallets are then lifted, via forklift, as shown in FIGS. 18A and 18B until the bottom surface of the bottommost pallet is positioned above the support latches 160, 170. The operator then actuates the pull chain 180 to move the support latches 160, 170 into the closed position as shown in FIGS. 19A and 19B. The pallets are then lowered such that the bottom surface of the bottommost pallets rest upon the flat surface 173 of the support latches 160, 170 as described above. The weight of the pallet or pallets 500 maintains the support latches 160, 170 in the closed position.

Figure 20A:
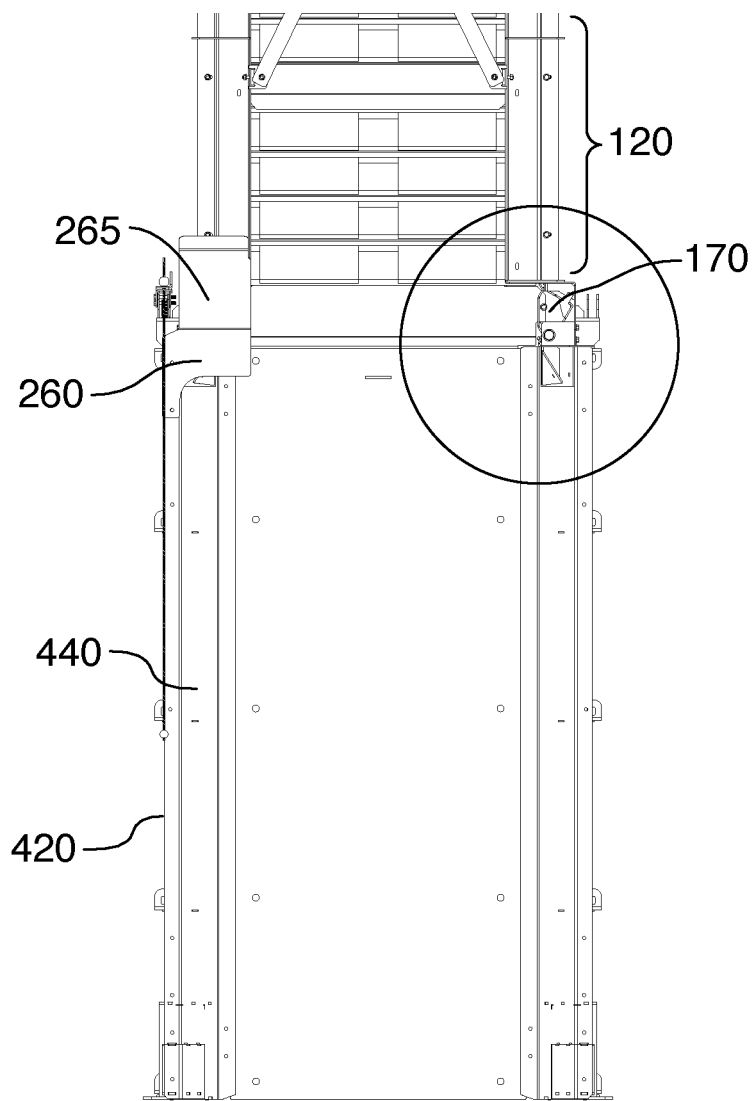
FIG. 20A is a front view of a pallet tower during the initial step of unloading pallets.
Figure 20B:
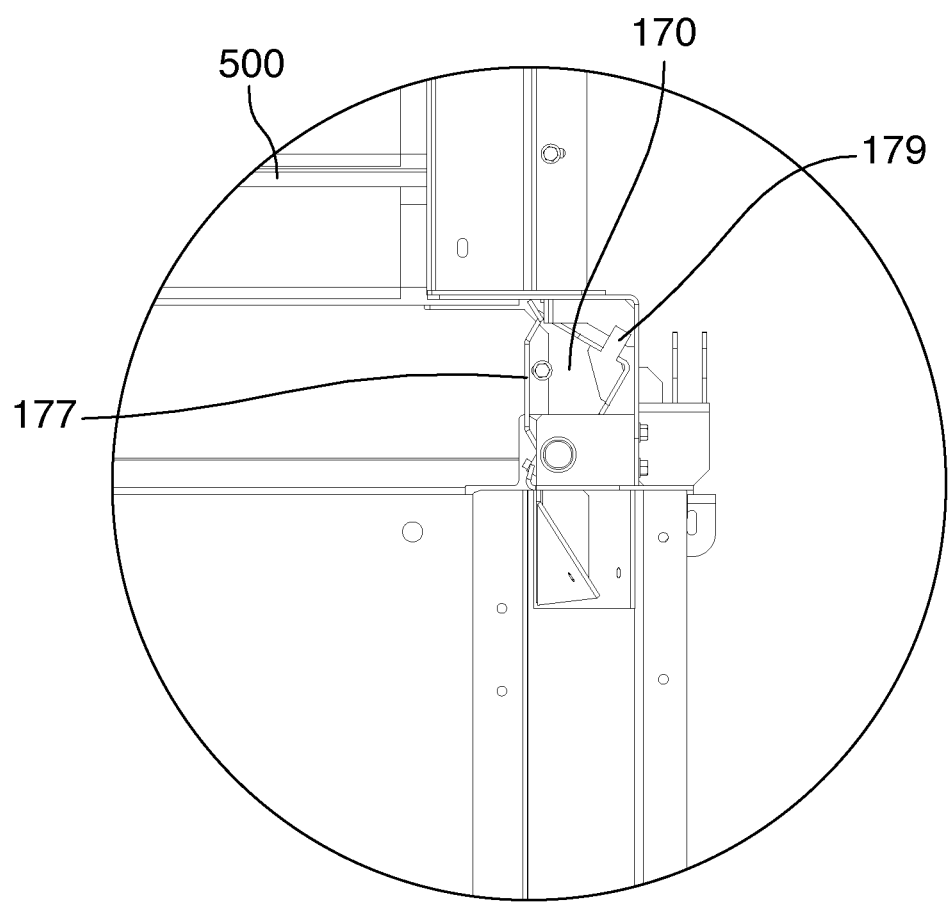
FIG. 20B is a detailed view of the support latch frame of FIG. 20A.
Figure 21A:
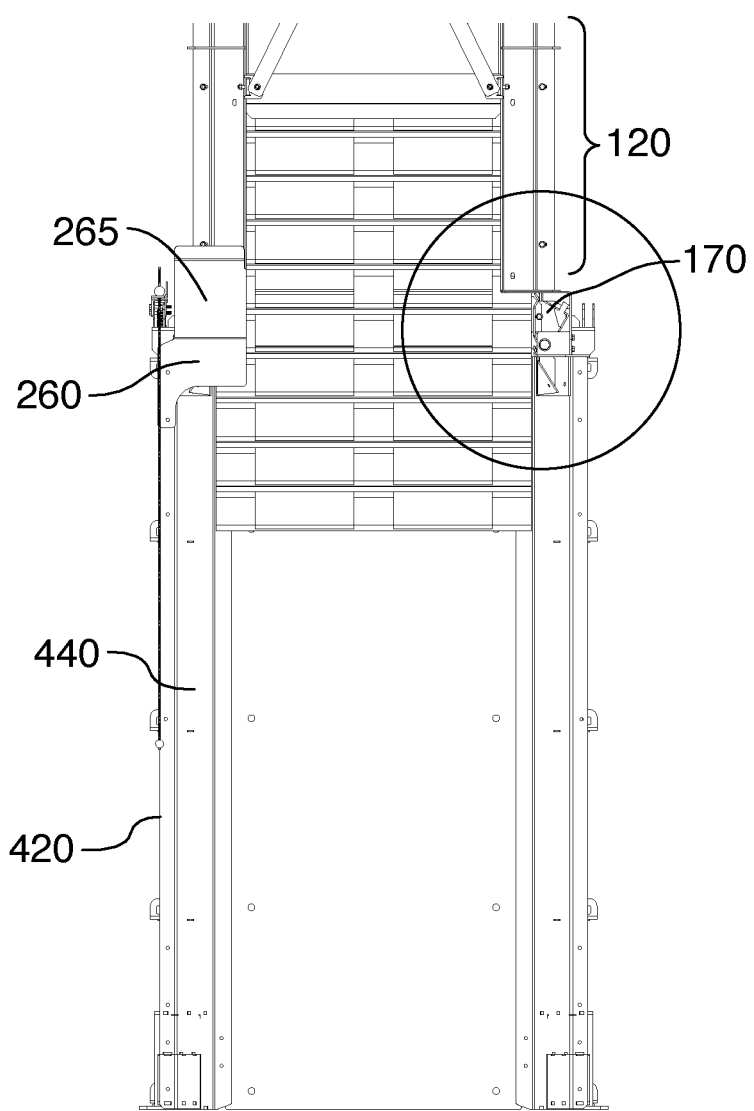
FIG. 21A is a front view of a pallet tower during an intermediate step of lowering pallets into the pallet receiving area.
Figure 21B:
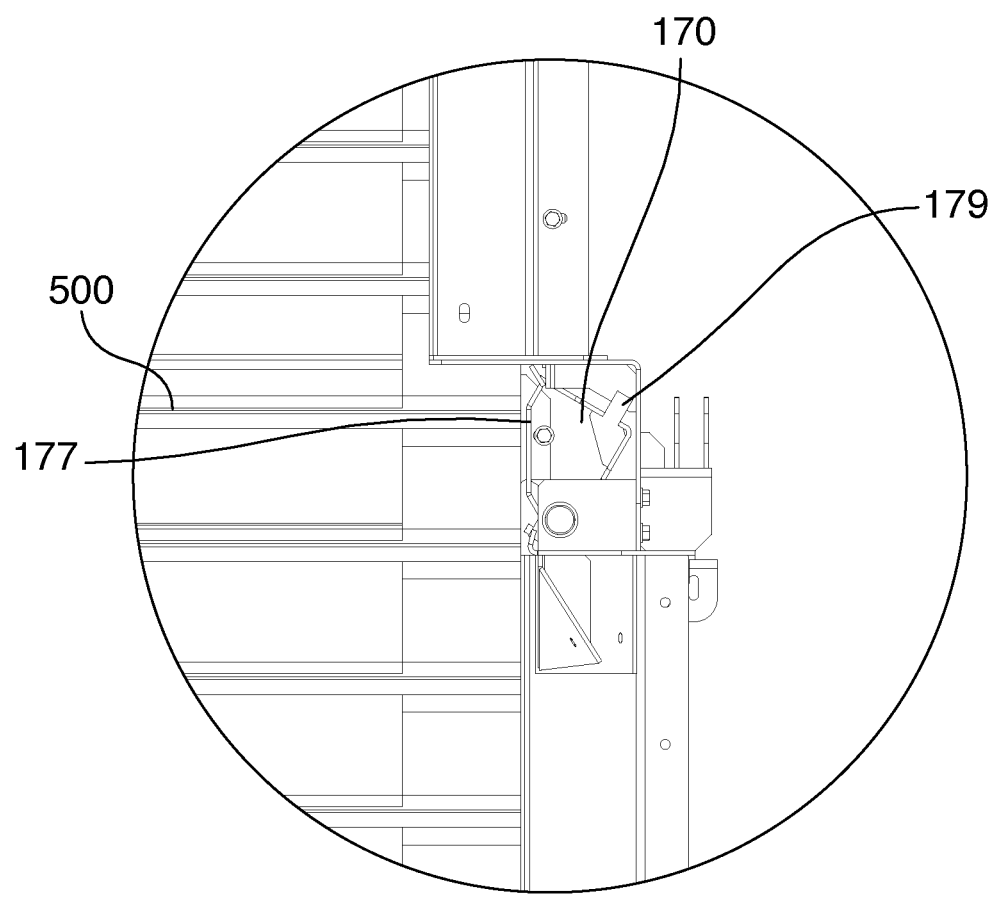
FIG. 21B is a detailed view of the support latch frame of FIG. 21A.
Figure 22A:
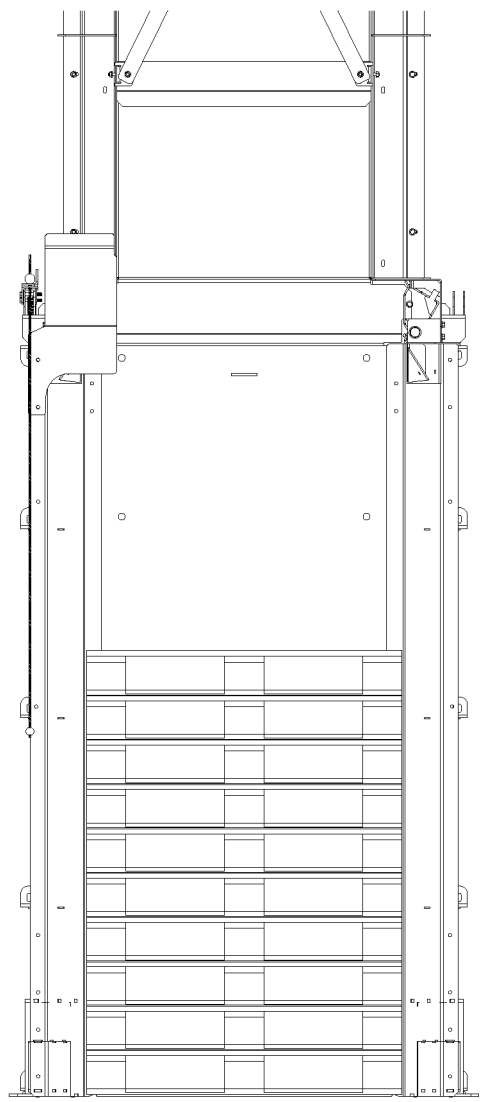
FIG. 22A is a front view of a pallet tower on completion of the unloading step.
Figure 22B:
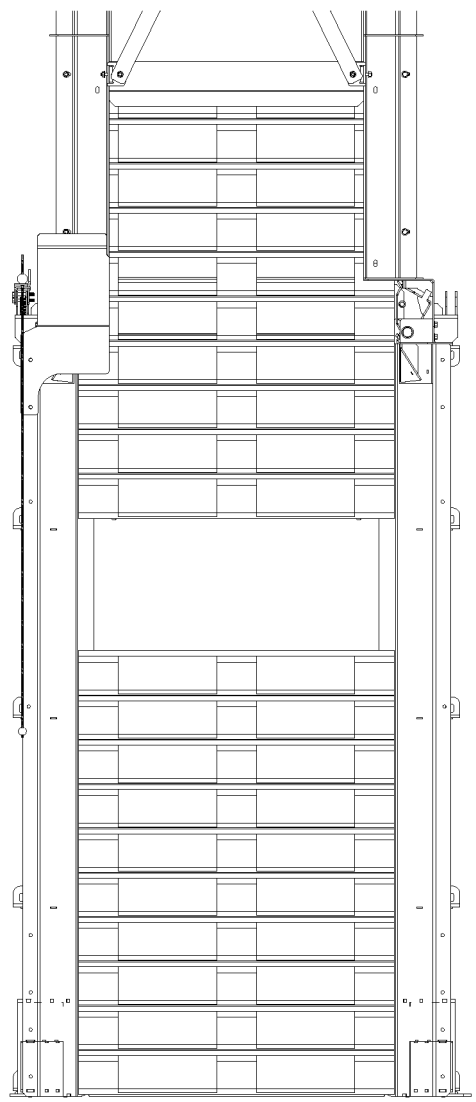
FIG. 22B is a front view of a pallet tower with a split pallet stack being stored.

To unload pallets from the pallet storage area 120 into the pallet receiving area 140, first the bottommost pallet is engaged by a forklift and is lifted off of the flat surface 173 of support latches 160, 170 as shown in FIG. 20A. The support latches will then spring into the default open position as shown in FIG. 20B. The operator does not have to pull or operate the latch pull chain 180 for the support latches 160, 170 to return to the default open position. The pallets 500 are then lowered into the pallet receiving area 140 as shown in FIGS. 21A and 21B. The pallets 500 may them be removed from the pallet receiving area 140 for use as shown in FIG. 22A.

Where fewer pallets are desired than are contained in the pallet receiving area 140, as shown in FIG. 22B, a forklift may engage a second (intermediate) pallet in the stack of pallets, and lift the new pallet stack into the pallet storage area 120 as described above for a full pallet stack in the pallet receiving area 140. Once the second pallet stack is stored, the desired pallets may then be removed from pallet receiving area 140 for use. In some cases, it may be preferable to keep a pallet or a pallet stack 500 in the pallet receiving area 140 as a safety measure to prevent injury to individuals from walking into pallet receiving area 140.

It is to be noted that the operation of pallet tower 100 may be performed solely according to mechanical functions, thus eliminating the requirement for any power source, whether electrical, pneumatic or hydraulic. In another embodiment, the operation of the support latches 160, 170 does not require any electrical, pneumatic, and/or hydraulic power source. Accordingly, the pallet tower 100 may be used in locations which lack access to these types of power sources. Also, the location would not require the installation of these types of power sources for operation of the pallet tower 100 and/or the support latches 160, 170.

Figure 26A:
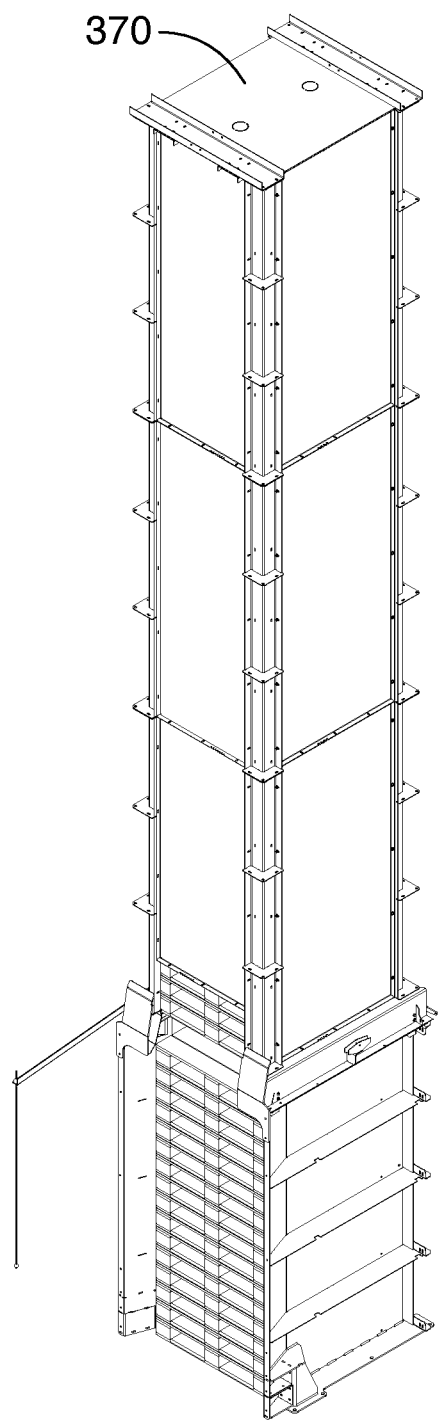
FIGS. 26A-D are front views of an alternate embodiment of the pallet tower including solid front panels and a moveable door.
Figure 26B:
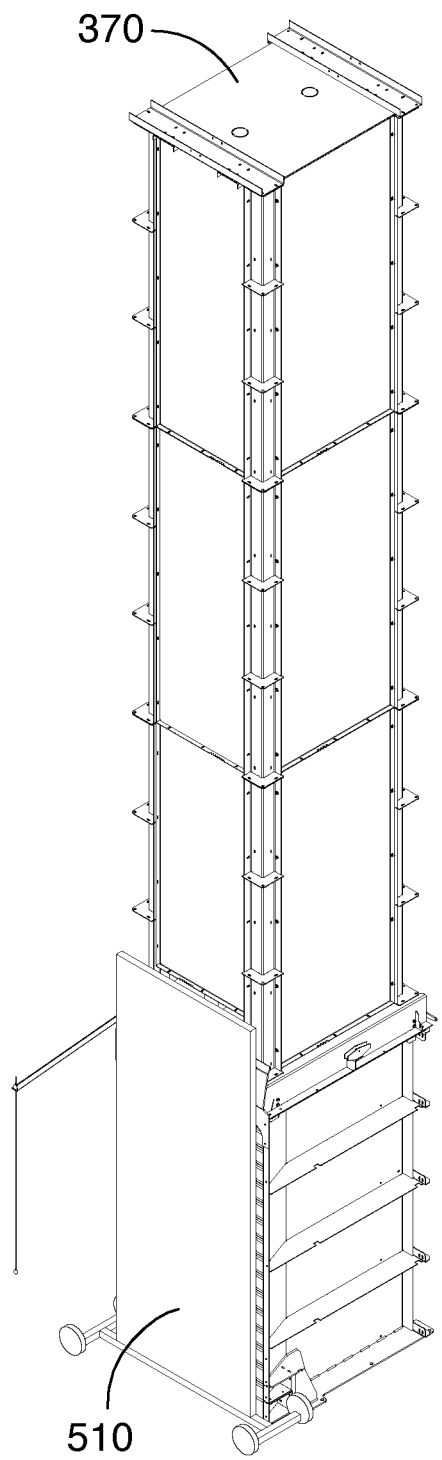
Figure 26C:
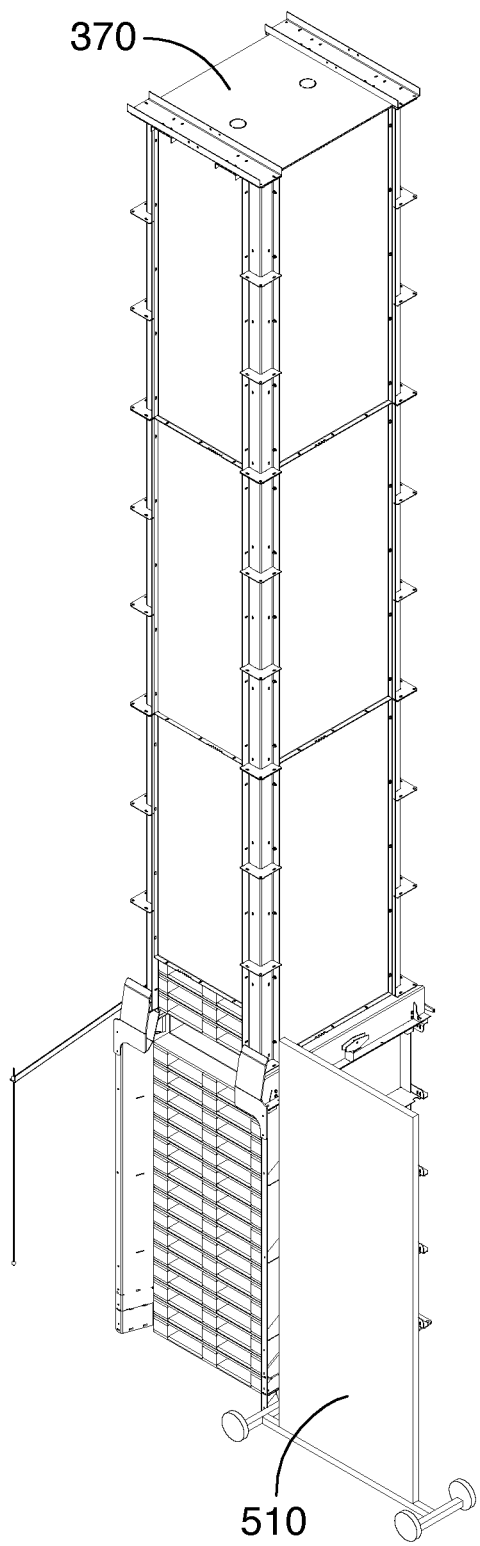
Figure 26D:
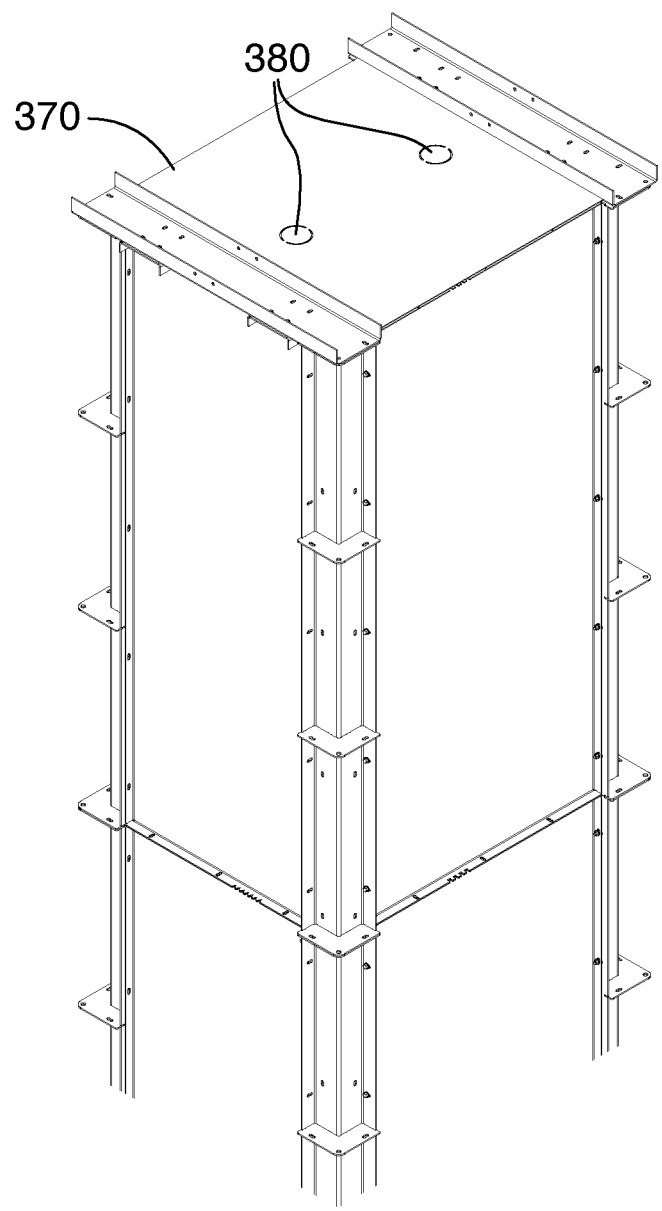

In an embodiment as shown in FIGS. 26A-C, the pallet magazine 300 may further include a solid front panel in place of crossbar 340 and diagonal crossbeams 350, and a solid rear panel 310 and solid side panels 320. In an embodiment, the solid panels may be made of sheet metal. The uppermost pallet magazine 300 may further includes a solid top panel 370. Thus, the pallet magazines 300 are fully enclosed in this embodiment. The pallet tower may further include a moveable door 510 which cooperates with the base frame 130 and the support latch frame 150 to enclose the pallet receiving area 140. The combination of the enclosed pallet magazines 300 in the containment frame 110 may then act to restrict the flow of oxygen inside the pallet tower 100 and reduce the risk of fire and may reduce the spread of fire. Furthermore, adding the moveable door 510 to further enclose the base frame 130 may then act to restrict the flow of oxygen inside the pallet tower 100 and reduce the risk of fire and may reduce the spread of fire. Optionally, the solid top panel 370 may include attachments and/or openings 380 as shown in FIG. 26D for a sprinkler system, as a further safety measure.

The pallet tower 100 may further include a pallet counter or similar device to indicate the number of pallets within the pallet storage area and/or if the pallet storage area is full. In accordance with the other elements of the pallet tower 100, a mechanical device, such as a weighted arm coupled to a flag, is preferred.

In an embodiment, the pallet receiving area as defined by the base frame is about 90 inches tall. In an embodiment, the pallet storage area may be defined by a containment frame with about two to four pallet magazines, with each pallet magazine about 92 inches tall. Typically, a pallet is about 4.5 to 6 inches tall.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

The invention claimed is:

1. A pallet tower for high density pallet storage, comprising:
   a base frame defining a pallet receiving area, the pallet receiving area for receiving a pallet;
   a containment frame supported above the base frame, the containment frame defining a pallet storage area for storing the pallet, and
   a support latch operable between an open configuration and a closed configuration, wherein the support latch in the closed configuration is configured to support the pallet when the pallet is in the pallet storage area, wherein the support latch is spring-biased to default to the open configuration.

2. The pallet tower of claim 1, wherein the support latch is a first pallet support latch, the pallet tower further including a second pallet support latch, the first pallet support latch and the second pallet support latch pivotally mounted to opposites sides of the pallet tower, the first and second pallet support latches each having a first surface for supporting opposite edges of a bottom surface of the pallet when in the closed configuration and the pallet is in the pallet storage area.

3. The pallet tower of claim 2, wherein the first and the second pallet support latches extend substantially along the side of the pallet tower and substantially support the entire opposite edges of the bottom surface of the pallet.

4. The pallet tower of claim 3, wherein the first and the second pallet support latches are connected by a latch connector bar for pivoting between the open configuration and the closed configuration at the same time.

5. The pallet tower of claim 4, wherein the first pallet support latch and the second pallet support latch stay in the closed configuration by the weight of the pallet, when the pallet is in the pallet storage area.

6. The pallet tower of claim 5, wherein the first pallet support latch and the second pallet support latch are not movable from the closed configuration to the open configuration when the pallet is in the pallet storage area and supported on the first surface of the first and the second pallet support latches.

7. The pallet tower of claim 2, wherein the first and the second pallet support latches each have a second surface with chamfered edges for acting as a vertical guide for the pallet and for preventing the pallet from catching when travelling between the pallet storage area and the pallet receiving area when in the open configuration.

8. The pallet tower of claim 1, further comprising a latch arm operatively connected to the support latch for manually urging the support latch from the open configuration to the closed configuration.

9. The pallet tower of claim 1, wherein the containment frame has 4 sides for enclosing the pallet when the pallet is in the pallet storage area.

10. The pallet tower of claim 1, wherein the containment frame has 1 side that allows for visual inspection of the pallet in the storage area.

11. The pallet tower of claim 1, wherein the containment frame has 4 solid panel sides and a solid panel top cover.

12. The pallet tower of claim 11, wherein the top cover is adapted to cooperate with a sprinkler and/or a fire suppression system.

13. The pallet tower of claim 1, further including a support latch frame secured to the base frame below the containment frame, wherein the support latch frame has a sloping chamfered surface that is perpendicular to side walls of the base frame for urging the pallet into alignment for the pallet storage area.

14. The pallet tower of claim 1, wherein the base frame has chamfered side walls for aligning the pallet side to side for the pallet receiving area.

15. The pallet tower of claim 1 further including a bump stop for providing resistance to a forklift, and a mast and back rest guide sloping chamfered surface for preventing a mast and/or a back rest of the forklift from catching on the pallet tower.

16. The pallet tower of claim 1, wherein, the pallet does not have side openings.

17. The pallet tower of claim 1, wherein the pallet tower does not require electrical, pneumatic, or hydraulic power for operation of the support latch.

18. The pallet tower of claim 1, further comprising a device for detecting when the pallet tower is full.

19. The pallet tower of claim 1, further comprising a movable door to enclose the pallet receiving area and the pallet storage area for restricting the flow of oxygen and reducing risk of a fire.

20. A method of loading pallets into a pallet tower, comprising:
moving a pallet into a pallet receiving area within the pallet tower, the pallet tower comprising a pallet storage area positioned above the pallet receiving area and further including a support latch operable between an open configuration and a closed configuration, with the support latch resting in the open configuration;
lifting the pallet within the pallet receiving area into the pallet storage area, and lifting the pallet such that a bottom of the pallet is positioned above the support latch;
setting the support latch to the closed configuration; and
lowering the pallet such that the bottom of the pallet is resting upon the support latch, and the pallet is holding the support latch in the closed configuration.

21. The method of claim 20, further comprising aligning the pallet to the pallet receiving area prior to lifting the pallet.

22. The method of claim 21, wherein the aligning occurs when receiving the pallet in the pallet receiving area.

23. The method of claim 21, wherein the aligning occurs during the lifting of the pallet from the pallet receiving area to the pallet storage area.

24. The method of claim 20, wherein the setting of the support latch to the closed configuration is performed manually.

25. The method of claim 20, wherein the support latch is maintained in the closed configuration via the weight of the pallet in the pallet storage area.

26. The method of claim 20, further comprising lowering a stored pallet within the pallet storage area onto the pallet in the pallet receiving area prior to the lifting step.

27. A method of unloading pallets from a pallet tower, comprising:
engaging a bottom pallet of a stored pallet stack within a pallet storage area in the pallet tower, the pallet tower comprising the pallet storage area positioned above a pallet receiving area and further including a support latch operable between an open configuration and a closed configuration;
lifting the stored pallet stack by the bottom pallet within the pallet storage area such that the bottom of the bottom pallet is not resting upon the support latch;
the support latch automatically returning to the open configuration; and
lowering the stored pallet stack into the pallet receiving area.

28. The method of claim 27, further comprising:
engaging a second pallet in the stored pallet stack, the second pallet in the pallet receiving area, with the pallets of the stored pallet stack below the second pallet remaining in the pallet receiving area, and the pallets above the second pallet including the second pallet forming a second stored pallet stack;
lifting the second stored pallet stack by the second pallet within the pallet storage area such that the bottom of the second pallet is positioned above the support latch;
setting the support latch to the closed configuration; and
lowering the second pallet such that the bottom of the second pallet is resting upon the support latch, the second pallet is holding the support latch in the closed configuration, and the second stored pallet stack is in the pallet storage area.

29. The method of claim 27, wherein the engaging, lifting, or lowering step is performed via a forklift or a powered lift device.

30. The method of claim 27, wherein moving the support latch to the closed position is performed manually by an operator.

31. The pallet tower of claim 1 in combination with a plurality of pallets loaded into the pallet receiving area.

32. The pallet tower of claim 1 in combination with a plurality of pallets in the pallet storage area.

33. The pallet tower of claim 32, wherein an interior alignment surface assists in aligning a pallet in a pallet stack moving from the pallet receiving area to the pallet storage area.

34. The pallet tower of claim 4, wherein the first and second support latches are configured to move from the closed configuration to an open configuration independent of a power source.

35. A pallet tower for high density pallet storage, comprising:
a base frame including a rear wall and a pair of side walls extending forward from the rear wall, the base frame defining a pallet receiving area, the pallet receiving area for receiving a plurality of pallets;
a containment frame supported above the base frame, the containment frame defining a pallet storage area for storing the pallet; and
a support latch operable between an open configuration and a closed configuration, wherein the support latch in the closed configuration is configured to support the pallet when the pallet is in the pallet storage area, wherein in the closed configuration the support latch is configured to support a bottom most pallet in the pallet storage area, wherein the pallet tower further includes a front opening at least partially defined by the side walls of the base frame and extending upward above the support latch.

36. The pallet tower of claim 35 wherein the front opening allows a forklift to lift the bottom most pallet in the storage area to a position above the support latch.

* * * * *